United States Patent
Wakashiro et al.

(10) Patent No.: US 6,949,897 B2
(45) Date of Patent: Sep. 27, 2005

(54) CONTROL DEVICE FOR HYBRID VEHICLE

(75) Inventors: Teruo Wakashiro, Shioya-gun (JP); Atsushi Matsubara, Utsunomiya (JP); Yasuo Nakamoto, Utsunomiya (JP); Atsushi Shibutani, Utsunomiya (JP); Morio Kayano, Utsunomiya (JP); Kazuya Ozono, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 10/489,318

(22) PCT Filed: Sep. 19, 2002

(86) PCT No.: PCT/JP02/09612

§ 371 (c)(1),
(2), (4) Date: Mar. 18, 2004

(87) PCT Pub. No.: WO03/026912

PCT Pub. Date: Apr. 3, 2003

(65) Prior Publication Data

US 2004/0232861 A1 Nov. 25, 2004

(30) Foreign Application Priority Data

Sep. 21, 2001 (JP) ........................................ 2001-289816

(51) Int. Cl.⁷ ................................................. H02P 5/00
(52) U.S. Cl. ....................... 318/139; 318/140; 318/148; 180/65.1; 180/65.2; 180/65.3; 180/65.4; 290/40 C; 701/22; 320/132
(58) Field of Search .......................... 318/139, 140–149, 318/430, 434, 34, 445, 473; 180/65.1, 65.2, 65.3, 65.4; 290/40 C; 701/22; 320/132

(56) References Cited

U.S. PATENT DOCUMENTS

| | | | | |
|---|---|---|---|---|
| 3,994,745 A | * | 11/1976 | Ludwig ........................ | 429/81 |
| 5,786,640 A | | 7/1998 | Sakai et al. | |
| 6,204,636 B1 | * | 3/2001 | Kinoshita et al. ............ | 320/134 |
| 6,314,346 B1 | | 11/2001 | Kitajima et al. | |
| 6,717,378 B2 | * | 4/2004 | Kitajima et al. ............... | 318/34 |
| 6,721,637 B2 | * | 4/2004 | Abe et al. ...................... | 701/22 |
| 2001/0004029 A1 | * | 6/2001 | Wakashiro et al. .......... | 180/170 |
| 2001/0040437 A1 | * | 11/2001 | Wakashiro et al. .......... | 318/139 |
| 2001/0042648 A1 | * | 11/2001 | Wakashiro et al. ......... | 180/65.2 |
| 2002/0108794 A1 | * | 8/2002 | Wakashiro et al. ......... | 180/65.2 |
| 2003/0015358 A1 | * | 1/2003 | Abe et al. ................... | 180/65.3 |
| 2003/0015874 A1 | * | 1/2003 | Abe et al. .................. | 290/40 C |
| 2004/0012206 A1 | * | 1/2004 | Wakashiro et al. ........ | 290/40 C |

FOREIGN PATENT DOCUMENTS

| | | |
|---|---|---|
| JP | 5-316658 | 11/1993 |
| JP | 7-107616 A | 4/1995 |
| JP | 07-123509 | 5/1995 |
| JP | 8-289407 | 11/1996 |
| JP | 9-84210 | 3/1997 |
| JP | 2000-170570 A | 6/2000 |
| JP | 2000-175364 A | 6/2000 |
| JP | 2000-228832 A1 | 8/2002 |

* cited by examiner

Primary Examiner—Paul Ip
(74) Attorney, Agent, or Firm—Arent Fox PLLC

(57) ABSTRACT

A control device for a hybrid vehicle which enables an appropriate electrical control based on the usable electrical energy stored in the battery device. In this control device, in step S357, in which it is determined whether the value of an energy storage zone B flag F_ ESZONEB is "1". When the result of the determination is "Yes", the operation proceeds to step S358. In step in step S358, the WOT assist amount lowest coefficient KQBWOASTL, which increases as the use-permission zone PECAPFIB of the state of charge SOC increases, is retrieved from a table. In step in step S359, the WOT assist amount coefficient,KQBWOAST, which increases from the lowest table value KQBWOASTL to a predetermined highest value as the state of charge SOC increases, is retrieved from a table, and a value obtained by multiplying the WOT assist command WOTAST and the WOT assist amount coefficient KQBWOAST retrieved from the table is newly set as the WOT assist command WOTAST.

5 Claims, 23 Drawing Sheets

CONTROL DEVICE FOR HYBRID VEHICLE

FIELD OF THE INVENTION

The present invention relates to a control device for a hybrid vehicle which is driven by an engine and an electric motor, and more specifically, the present invention relates to a control device which controls a vehicle while maintaining a state of charge of a battery device in an appropriate range.

DESCRIPTION OF RELATED ART

Conventionally, a hybrid vehicle having not only an engine but also an electric motor as the drive source is known.

As a hybrid vehicle, a parallel hybrid vehicle is known which uses an electric motor as an auxiliary drive source for assisting the engine output. In such a parallel hybrid vehicle, for example, the power of the engine is assisted using the electric motor during acceleration, whereas during deceleration, the battery or the like is charged using a deceleration regenerative operation. According to various control operations including the above, the electrical energy (hereinafter referred to as state of charge) of the battery is maintained while also satisfying the driver's demands. An example of such a hybrid vehicle is disclosed in Japanese Unexamined Patent Application, First Publication No. Hei 7-123509.

The state of charge corresponds to the total amount of electrical charge stored in the battery; therefore, in order to measure the state of charge of the battery installed in such a hybrid vehicle, a method is known in which, for example, the state of charge of the battery is calculated by calculating accumulated charging amount and accumulated discharging amount by measuring both charging current to the battery and discharging current from the battery in every predetermined period, and by adding to or subtracting from the initial state of charge or the state of charge immediately before starting charging or discharging.

On the other hand, in the case of a battery device such as a nickel metal hydride (NiMH) battery or the like whose charging efficiency or discharging efficiency is degraded during charging or discharging under high temperature conditions, a method is known in which accumulated charging amount and accumulated discharging amount are calculated by preparing a charging and discharging efficiency map or calculation equation representing variation in charging efficiency and discharging efficiency depending on the temperature of the battery, and by accumulating measured charging current and discharging current which have been corrected using the charging efficiency and discharging efficiency.

In the case of the above-mentioned conventional hybrid vehicle, the above charging and discharging efficiency map or calculation equation used for measuring or calculating the state of charge of the battery is prepared based on the voltage characteristics of the battery, which has not been degraded, in a steady state. When the battery is degraded, or when memory effects or the like depending on the history of charging and discharging are present, because charging efficiency and discharging efficiency are degraded, the accumulated charging amount and accumulated discharging amount deviate from the true values, and the accuracy in calculating the accumulated charging amount and accumulated discharging amount is degraded; consequently, the state of charge cannot be measured accurately, which is a problem, if the accumulated charging amount and accumulated discharging amount are calculated by correcting the measured charging current and discharging current using the charging and discharging efficiency map or calculation equation.

When the accuracy in calculating the state of charge is degraded as mentioned above, the operating life of the battery may be shortened due to, for example, use of the battery when the present state of charge is out of a zone in which use of the battery is permitted, or it may not be possible to realize an appropriate electrical control due to, for example, misdetermination of a zone in which use of the battery is permitted.

As a countermeasure for the above problem, the charging and discharging efficiency map or calculation equation may be prepared while, for example, taking aging effects such as degradation of the battery into consideration; however, in this case, the usable energy stored in the battery cannot be effectively used while the charging and discharging efficiencies are not degraded, and the fuel consumption of the vehicle cannot be improved, which is also a problem.

SUMMARY OF THE INVENTION

The present invention was conceived in view of the above circumstances, and it is an object thereof to provide a control device for a hybrid vehicle, which enables an appropriate electrical control based on the usable electrical energy stored in the battery device.

In order to achieve the above object, the present invention provides a control device for a hybrid vehicle having an engine and a motor for driving the vehicle, and a battery device storing electrical energy converted, by the motor, from a part of the output of the engine or the kinetic energy of the vehicle, the control device comprising: a control pattern setting section for classifying a state of charge of the battery device into predetermined zones and for setting a specific control pattern for each of the predetermined zones; a state of charge calculating section for calculating the state of charge of the battery device and calculating a use-permission zone with respect to the state of charge; an assist amount setting section for setting an amount of power assist provided by the motor for assisting the output of the engine depending on the control pattern set by the control pattern setting section; and an assist amount correcting section for correcting the amount of power assist in accordance with the width of the use-permission zone calculated by the state of charge calculating section.

According to the control device for a hybrid vehicle constructed above, the control pattern setting section classifies the state of charge of the battery device into predetermined zones so that the battery device is differently used in accordance with the state of charge, and the control pattern setting section sets a specific control pattern for each of the predetermined zones. The assist amount setting section sets a specific amount of power assist for each of the predetermined zones set by the control pattern setting section. The assist amount correcting section corrects the amount of power assist in accordance with the width of the use-permission zone calculated by the state of charge calculating section, i.e., in accordance with the width of a zone in which use of the battery device is permitted for the present state of charge of the battery device.

Accordingly, because the amount of power assist is properly calculated taking the use-permission zone for the present state of charge into consideration even when, for example, the charging and discharging efficiencies of the battery are degraded, the usable electrical energy stored in the battery can be effectively used.

In the above control device for a hybrid vehicle, the control pattern setting section may set a temporary use zone, as one of the predetermined zones, between a charging and discharging permission zone in which both charging and discharging are permitted, and a discharging restriction zone in which charging is permitted and discharging is restricted, and in the temporary use zone, the assist amount setting section may set the amount of power assist in accordance with the state of charge calculated by the state of charge calculating section.

In the above control device for a hybrid vehicle, when, for example, the state of charge is decreased from the charging and discharging permission zone toward the discharging restriction, the discharge amount of the battery device, i.e., the amount of power assist may be set so as to be gradually decreased in the temporary use zone.

Accordingly, because it is possible to smoothly change the amount of power assist from the charging and discharging permission zone in which both charging and discharging are permitted to the discharging restriction zone in which charging is permitted and discharging is restricted, the usable electrical energy stored in the battery can be effectively used while ensuring a smooth driveability of the vehicle.

In the above control device for a hybrid vehicle, the assist amount correcting section may alter the minimum value of the amount of power assist, which is to be set by the assist amount setting section in accordance with the state of charge, in accordance with the width of the use-permission zone calculated by the state of charge calculating section.

According to the control device for a hybrid vehicle constructed above, the wider the use-permission zone, the greater the minimum value of the amount of power assist can be set; therefore, the total amount of power assist, which is output during transition from the charging and discharging permission zone to the discharging restriction zone, is increased.

Accordingly, the usable electrical energy stored in the battery can be effectively used, whereby the fuel consumption of the vehicle can be improved.

DESCRIPTION OF THE PREFERRED EMBODIMENTS

Preferred embodiments of the present invention will now be explained with reference to the appended drawings.

Figure 1:
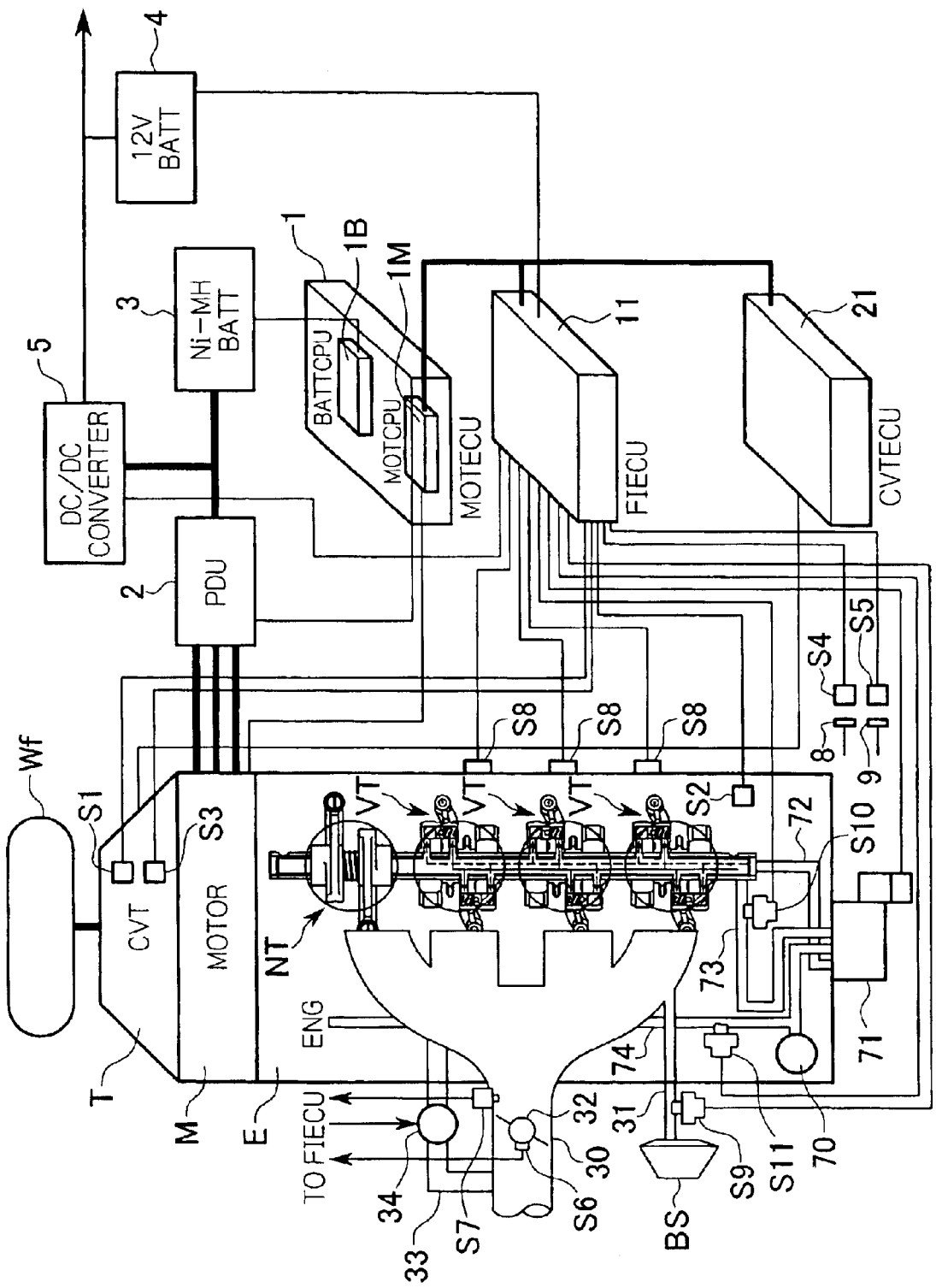
FIG. 1 is a block diagram showing the general structure of a hybrid vehicle having a control device for a hybrid vehicle according to an embodiment of the present invention.

FIG. 1 is a block diagram schematically illustrating a parallel hybrid vehicle in an embodiment of the present invention, in which an engine E, an electric motor M, and a transmission T are directly coupled to each other in series. The driving force generated by both the engine E and the electric motor M is transmitted via, for example, a CVT (continuously variable transmission) as the transmission T (the transmission T may be a manual transmission) to front wheels Wf as driving wheels. When the driving force is transmitted from the driving wheels Wf to the electric motor M during deceleration of the hybrid vehicle, the electric motor M functions as a generator for applying a so-called regenerative braking force to the vehicle, i.e., the kinetic energy of the vehicle is recovered and stored as electric energy. Note that elements related to both a vehicle having a manual transmission and a vehicle having a CVT are shown in FIG. 1 for convenience of explanation.

The driving of the motor M and the regenerating operation of the motor M are controlled by a power drive unit (PDU) 2 according to control commands from a motor CPU 1M of a motor ECU 1. A high-voltage nickel metal hydride (Ni-MH) battery 3 for sending and receiving electric energy to and from the motor M is connected to the power drive unit 2. The battery 3 includes a plurality of modules connected in series, and in each module, a plurality of cell units are connected in series. The hybrid vehicle includes a 12-volt auxiliary battery 4 for energizing various accessories. The auxiliary battery 4 is connected to the battery 3 via a downverter 5 or a DC-DC converter. The downverter 5, controlled by an FIECU 11, makes the voltage from the battery 3 step-down and charges the auxiliary battery 4. Note that the motor ECU 1 comprises a battery CPU 1B for protecting the battery 3 and calculating the remaining battery charge thereof In addition, a CVTECU 21 is connected to the transmission T, which is a CVT, for controlling the same.

The FIECU 11 controls, in addition to the motor ECU 1 and the downverter 5, a fuel injection valve (not shown) for controlling the amount of fuel supplied to the engine E, a starter motor, ignition timing, etc. To this end, the FIECU 11 receives various signals such as a signal from a speed sensor S1 for sensing vehicle speed VP, a signal from an engine revolution speed sensor S2 for sensing engine revolution speed NE, a signal from a shift position sensor S3 for sensing the shift position of the transmission T, a signal from a brake switch S4 for detecting the operation of a brake pedal 8, a signal from a clutch switch S5 for detecting the operation of a clutch pedal 9, a signal from a throttle opening-degree sensor S6 for sensing the degree of throttle opening TH of a throttle valve 32, a signal from an intake negative pressure sensor S7 for sensing negative pressure in the air-intake passage, a signal from a knocking sensor S8, and the like.

Reference symbol BS indicates a booster associated with the brake pedal, in which a master vac negative pressure sensor S9 is provided for sensing negative pressure in the brake master vac (hereinafter referred to as master vac negative pressure). The master vac negative pressure sensor S9 is connected to the FIECU 11.

Note that the intake negative pressure sensor S7 and the throttle opening-degree sensor S6 are provided in an air-intake passage 30, and the master vac negative pressure sensor S9 is provided in a communication passage 31 connected to the air-intake passage 30.

The air-intake passage 30 is provided with a secondary air passage 33 for air communication between the upstream portion with respect to the throttle valve 32 and the downstream portion, and the secondary air passage 33 is provided with a control valve 34. The purpose of providing the secondary air passage 33 is to supply a small amount of air into the cylinders even when the air-intake passage 30 is completely closed by the throttle valve 32. The control valve 34 is controlled by means of the signal from the FIECU 11 in accordance with the intake negative pressure measured by the intake negative pressure sensor S7.

A POIL (oil pressure) sensor S10, a solenoid of a spool valve 71, and a TOIL (oil temperature) sensor S11 are also connected to the FIECU 11.

The engine E includes three cylinders associated with the variable valve timing mechanism VT on both an intake side and an exhaust side, and a cylinder associated with a conventional valve mechanism NT which has no relationship to the cylinder deactivation operation.

In other words, the engine E is a deactivatable engine in which the operation state may be alternated between normal operation in which all four cylinders including three deactivatable cylinders are active and a cylinder deactivation operation in which three deactivatable cylinders are inactive. In the engine E, the operation of the intake valves IV and exhaust valves EV associated with the deactivatable cylinders can be temporarily stopped by means of the variable valve timing mechanism VT.

Zoning of the State of Charge of the Battery SOC

Next, zoning of the state of charge of the battery SOC, i.e., classifying the state of charge into zones, will be explained below. The state of charge of the battery is calculated in a battery CPU 1B based on, for example, voltage, discharging current, temperature, etc.

As an example of zoning, first, a zone A which is a normal use zone (from SOC 40% to SOC 75%) is set, a zone B which is a temporary use zone (from SOC 25% to SOC 40%) is set below the zone A, and a zone C which is an excessively discharged zone (from SOC 0% to SOC 25%) is set below the zone B. Furthermore, a zone D which is an excessively charged zone (from SOC 75% or more) is set above the zone A.

An energy management mode for the zone A which is the normal use zone constitutes a charging and discharging permission mode in which both charging and discharging are permitted, and an energy management mode for the zone C which is the excessively discharged zone constitutes a discharging restriction mode in which charging is permitted and discharging is restricted.

The battery CPU 1B constitutes a charged state measuring section.

MA (motor) Basic Mode

Next, an MA (motor) basic mode defining the operation modes of the motor M will be explained below with reference to flowcharts shown in FIGS. 2 and 3.

Note that this procedure will be repeated at a predetermined period.

The MA (motor) basic mode includes an "idle mode", an "idle stop mode", a "deceleration mode", "a cruise mode", and an "acceleration mode". In the idle mode, fuel supply is re-started after fuel cut operation, and the engine E is maintained in an idling state. In the idle stop mode, the engine is stopped under certain conditions when, for example, the vehicle does not travel. In the deceleration mode, a regenerative braking operation is performed by the motor M. In the acceleration mode, the driving power of the engine E is assisted by the motor M. In the cruise mode, the motor M is not operated, and the vehicle is driven solely by the engine E.

Note that although the hybrid vehicle in this embodiment has a CVT, each of the following flowcharts includes descriptions related to both a vehicle having a CVT and a vehicle having a manual transmission (MT) for convenience in explanation.

Figure 2:
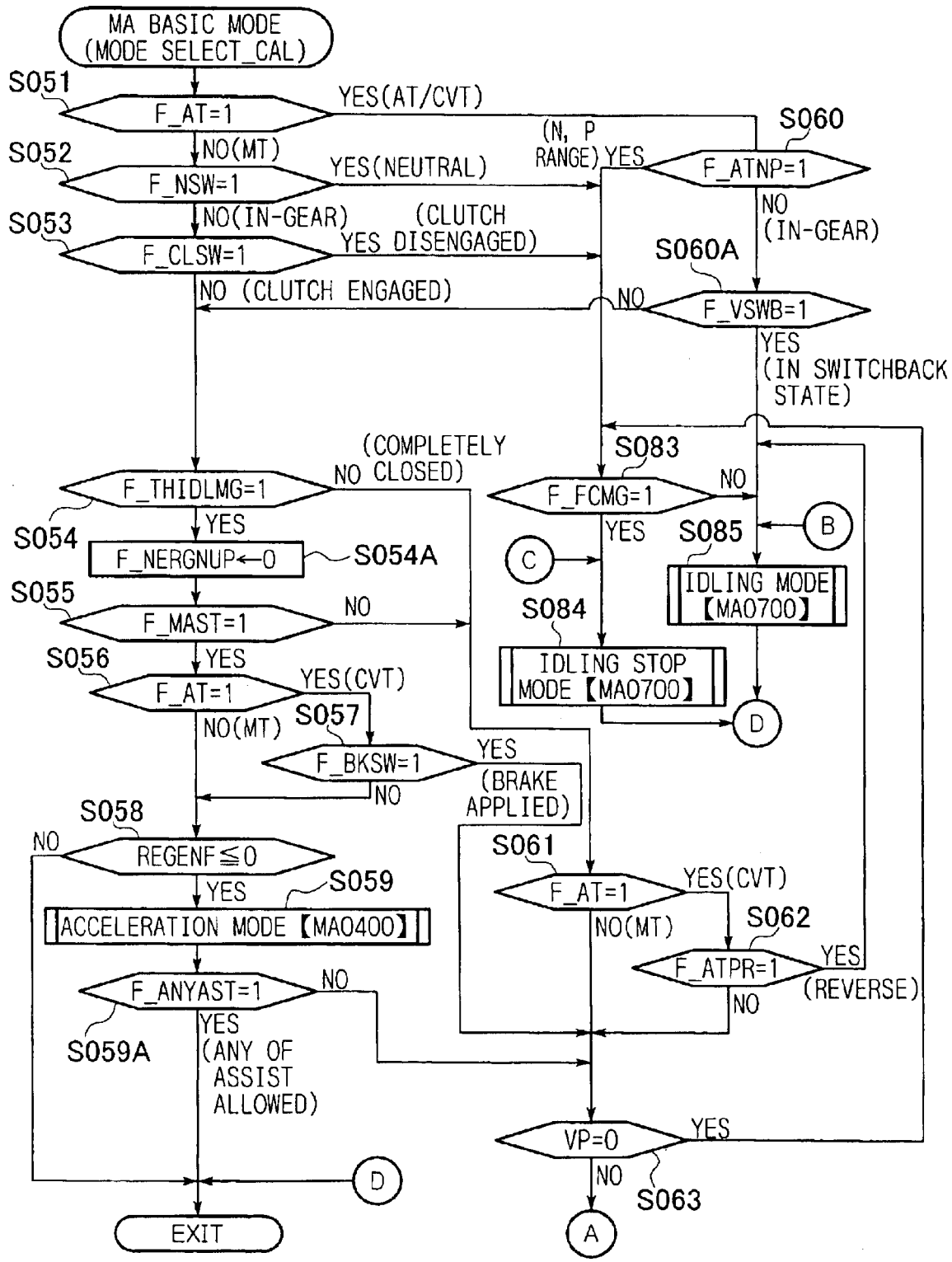
FIG. 2 is a flowchart showing the operation for determining motor operation modes.
Figure 3:
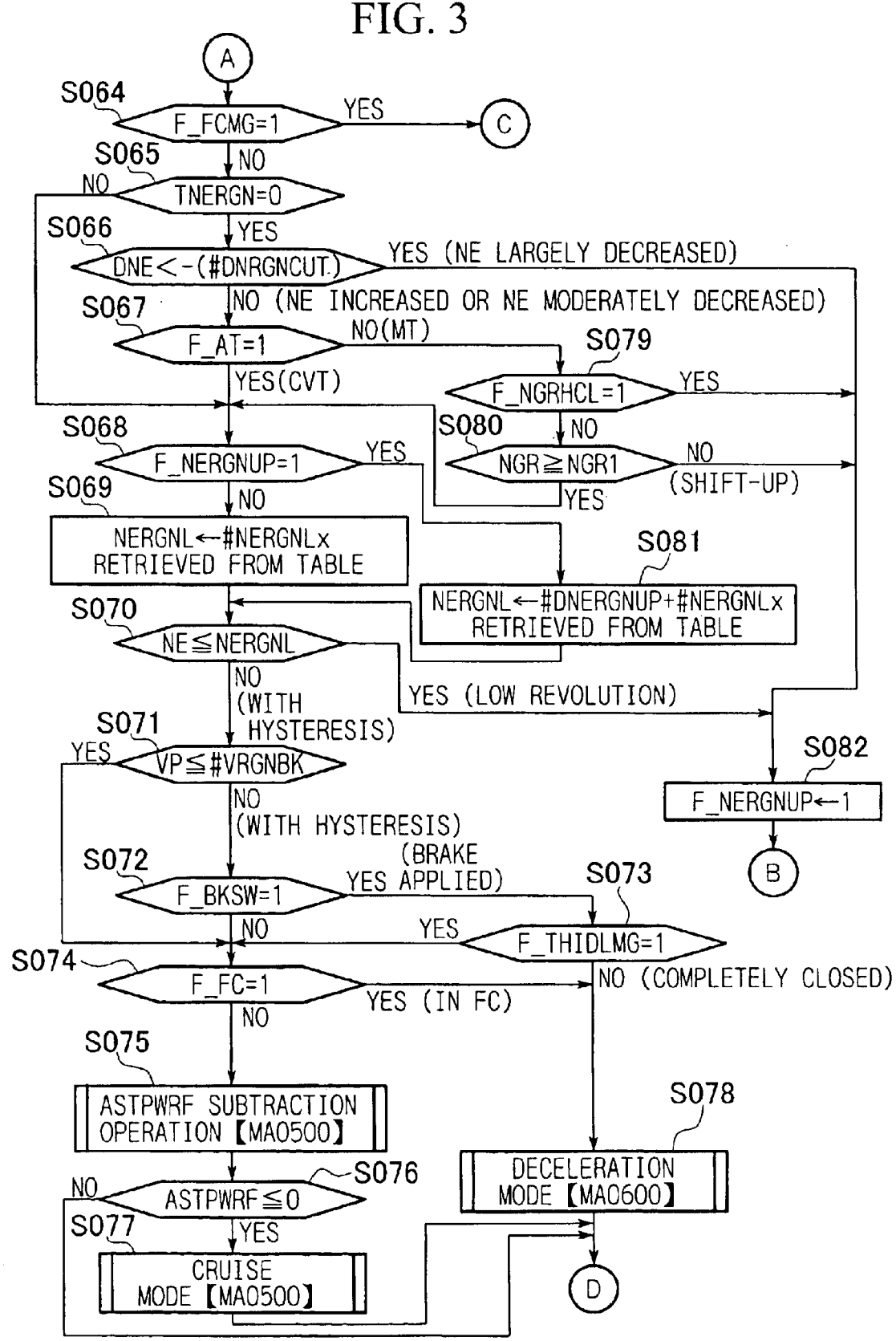
FIG. 3 is also a flowchart showing the operation for determining the motor operation modes.

In step S051 shown in FIG. 2, it is determined whether the value of an MT/CVT indication flag F__AT is "1". When the result of the determination is "YES", which means that the present vehicle employs a CVT, the operation proceeds to step S060, and when the result is "NO", which means that the present vehicle employs an MT, the operation proceeds to step S052.

In step S060, it is determined whether the value of an in-gear indication flag F__ATNP for a CVT is "1". When the result of the determination is "YES", which means that the transmission is in N (neutral) or P (parking) position, the operation proceeds to step S083, and when the result is "NO", which means that the vehicle is in an in-gear state (in driving mode), the operation proceeds to step S060A.

In step S060A, it is determined, by checking whether the value of a switchback flag F__VSWB is "1", whether the shift lever of the vehicle is in a switchback state in which the shift lever is operated, and the shift position is not determined. When the result of the determination is "YES", which means that the shift lever is in the switchback state, the operation proceeds to step S085, and then the motor operation mode is set in the "idle mode", and the control operation is terminated. In the idle mode, the engine E is maintained in an idling state. When the result of the determination is "NO", which means that the shift lever is not in the switchback state, the operation proceeds to step S054.

In step S083, it is determined whether the value of an engine stop control executing flag F_FCMG is "1". When the result of the determination in step S083 is "NO", the operation proceeds to step S085 to set the motor operation mode in the "idle mode", and the control operation is terminated. When the result of the determination in step S083 is "YES", the operation proceeds to step S084 to set the motor operation mode in the "idle stop mode", and the control operation is terminated. In the idle stop mode, the engine is stopped under certain conditions when, for example, the vehicle does not travel.

In step S052, it is determined whether the value of a neutral position indicating flag F_NSW is "1". When the result of the determination is "YES", which means that the transmission is in a neutral state, the operation proceeds to step S085, and when the result is "NO", which means that the transmission is in an in-gear state, the operation proceeds to step S053.

In step S053, it is determined whether the value of a clutch disengagement indicating flag F_CLSW is "1". When the result of the determination is "YES", which means that the clutch is disengaged, the operation proceeds to step S083, and when the result is "NO", which means that the clutch is engaged, the operation proceeds to step S054.

In step S054, it is determined whether the value of an idling indicating flag F_THIDLMG is "1". When the result of the determination is "NO", which means that the throttle of the engine is completely closed, the operation proceeds to step S061, and when the result is "YES", which means that the throttle is not completely closed, the operation proceeds to step S054A.

In step S054A, an engine revolution increasing flag F_NERGNUP during a half-clutch state is set to "0", and the operation proceeds to step S055.

In step S055, it is determined whether the value of a motor assist indication flag F_MAST is "1". Based on this flag, it is determined whether or not the engine E should be assisted by the motor M. When the flag F_MAST is "1", assist by the motor M is required, and when the flag F_MAST is "0", assist by the motor M is not required. Note that the motor assist indication flag is set in the assist trigger determination procedure.

When the result of the determination in step S055 is "NO", the operation proceeds to step S061, and when the result of the determination in step S055 is "YES", the operation proceeds to step S056.

In step S056, it is determined whether the value of an MT/CVT indication flag F_AT is "1". When the result of the determination is "YES", which means that the present vehicle employs a CVT, the operation proceeds to step S057, and when the result is "NO", which means that the present vehicle employs an MT, the operation proceeds to step S058.

In step S057, it is determined whether a brake operation indicating flag F_BKSW is "1". When the result of the determination is "YES", which means that the brake of the vehicle is applied, the operation proceeds to step S063, and when the result is "NO", which means that the brake of the vehicle is not applied, the operation proceeds to step S058.

In step S058, it is determined whether a final charging command REGENF is "0". When the result of the determination is "YES", the operation proceeds to step S059 to set the motor operation mode in the "acceleration mode". In the acceleration mode, the engine E is assisted by the motor M, and the operation proceeds to step S059A. When the result of the determination in step S058 is "NO", the control operation is terminated.

In step S059A, it is determined whether an assist permission flag F_ANYAST, which indicates that assist by the motor is permitted, is "1". When the result of the determination is "YES", which means that assist by the motor is permitted, the control operation is terminated, and when the result is "NO", the operation proceeds to step S063.

In step S061, it is determined whether the value of an MTCVT indication flag F_AT is "1". When the result is "NO", which means that the present vehicle employs an MT, the operation proceeds to step S063, and when the result of the determination is "YES", which means that the present vehicle employs a CVT, the operation proceeds to step S062.

In step S062, it is determined whether the value of a reverse position indicating flag F_ATPR is "1". When the result of the determination is "YES", which means that the transmission is in a reverse state, the operation proceeds to step S085, and when the result is "NO", which means that the transmission is in a state other than the reverse state, the operation proceeds to step S063.

In step S063, it is determined whether a vehicle speed VP is "0". When the result of the determination is "YES", the operation proceeds to step S083, and when the result of the determination is "NO", the operation proceeds to step S064.

In step S064, it is determined whether the value of an engine stop control executing flag F_FCMG is "1". When the result of the determination is "NO", the operation proceeds to step S065, and when the result is "YES", the operation proceeds to step S084.

In step S065, it is determined whether the value of a delay timer TNERGN, which is used for delaying determination operation for cancellation of compulsory regeneration at shift change, is "0". When the result of the determination is "YES", the operation proceeds to step S066, and when the result is "NO", the operation proceeds to step S068.

In step S066, it is determined whether the value of an engine revolution change ratio DNE is smaller than a negative portion of a determinative engine revolution #DNRGNCUT, which is used for canceling regeneration based on the DNE. Note that the determinative engine revolution #DNRGNCUT is the DNE, i.e., change ratio of engine revolution NE, at which determination whether or not regenerative energy should be decreased is made.

When the result of the determination in step S066 is "YES", which means that the engine revolution NE is largely decreased, the operation proceeds to step S082. In step S082, the engine revolution increasing flag F_NERGNUP is set to "1", and the operation proceeds to step S085.

When the result of the determination in step S066 indicates that the engine revolution is increased, or the result of the determination is "NO", which means that the engine revolution NE is not largely decreased, the operation proceeds to step S067.

In step S067, it is determined whether the value of an MT/CVT indication flag F_AT is "1". When the result of the determination is "NO", which means that the present vehicle employs an MT (manual transmission), the operation proceeds to step S079, and when the result is "YES", which means that the present vehicle employs a CVT, the operation proceeds to step S068.

In step S079, it is determined whether the value of a half-clutch indication flag F_NGRHCL is "1". When the result of the determination is "YES", which means that the vehicle is in a half-clutch state, the operation proceeds to step S082, and when the result is "NO", which means that the vehicle is not in a half-clutch state, the operation proceeds to step S080.

In step S080, the previous gear position and the current gear position are compared by comparing a previous gear position NGR and a current gear position NGR 1, and it is determined whether a shift-up operation has been performed.

When the result of the determination in step S080 is "NO", which means that a shift-up operation has been performed, the operation proceeds to step S082. When the result of the determination in step S080 is "YES", which means that a shift-up operation has not been performed, i.e., the previous gear position and the current gear position are the same with respect to each other, the operation proceeds to step S068.

In step S068, it is determined whether the value of the engine revolution increasing flag F_NERGNUP is "1". When it is determined that the flag is set to "1", i.e., the result of the determination is "YES", which means that it is required to increase the engine revolution during a half-clutch state, the operation proceeds to step S081, in which an increasing engine revolution #DNEGRNUP for preventing hunting is added to a lowest permissible engine revolution for electrical charge #NERGNLx which is set for each of the gear positions, and the result is set as a lowest permissible engine revolution for electrical charge NERGNL, and then the operation proceeds to step S070.

When it is determined in step S068 that the flag is reset to "0", i.e., the result of the determination is "NO", which means that it is not required to increase the engine revolution during a half-clutch state, the operation proceeds to step S069, in which the lowest permissible engine revolution for electrical charge #NERGNLx, which is set for each of the gear positions, is set as a lowest permissible engine revolution for electrical charge NERGNL, and then the operation proceeds to step S070.

In step S070, it is determined whether the engine revolution NE is equal to or below the lowest permissible engine revolution for electrical charge NERGNL. When the result of the determination is "YES", which means that the engine revolution NE is equal to or below the lowest permissible engine revolution for electrical charge NERGNL, i.e., NE≦NERGNL, the operation proceeds to step S082. When the result of the determination is "NO", which means that the engine revolution NE is above the lowest permissible engine revolution for electrical charge NERGNL, i.e., NE>NERGNL, the operation proceeds to step S071.

In step S071, it is determined whether the vehicle speed VP is equal to or below a lowest permissible vehicle speed #VRGNBK which is used for determining a braking operation during a deceleration mode. Note that the lowest permissible vehicle speed #VRGNBK includes hysteresis. When the result of the determination is "YES", which means that the vehicle speed VP≦the lowest permissible vehicle speed #VRGNBK, the operation proceeds to step S74. When the result of the determination in step S071 is "NO", which means that the vehicle speed VP >the lowest permissible vehicle speed #VRGNBK, the operation proceeds to step S072.

In step S072, it is determined whether the brake operation indicating flag F_BKSW is "1". When the result of the determination is "YES", the operation proceeds to step S073, and when the result is "NO", the operation proceeds to step S074.

In step S073, it is determined whether an idling indication flag F_THIDLEMG is "1". When the result of the determination is "NO", which means that the throttle is completely closed, the operation proceeds to step S078 for the "deceleratin mode", and the control operation is terminated. Note that in the "deceleratin mode", a regenerative braking operation is performed by the motor M.

In step S074, it is determined whether the value of a fuel cut-off flag F_FC is "1". This flag is set to "1" when the regenerative braking operation is performed by the motor M in step S078 for a "deceleratin mode", and is used for executing a fuel-cut operation. When the result of the determination in step S074 is "YES", which means that the fuel-cut operation is performed, the operation proceeds to step S078, and when the result in step S074 is "NO", which means that the fuel-cut operation is not performed, the operation proceeds to step S075.

In step S075, a subtraction operation for a final assist command ASTPWRF is performed, and the operation proceeds to step S076. In step S074, it is determined whether the final assist command ASTPWRF is "0". When the result of the determination is "YES", the operation proceeds to step S077 for the "cruise mode", and the control operation is terminated. In the cruise mode, the motor M is not operated, and the vehicle is driven solely by the engine E. In addition, if necessary, an electrical charge for the battery 3 is performed by using the motor M as a generator, i.e., in a regenerative mode, depending on the running state of the vehicle.

When the result of the determination in step S076 is "NO", the control operation is terminated.

Operation for Determination of Assist Trigger

Figure 4:
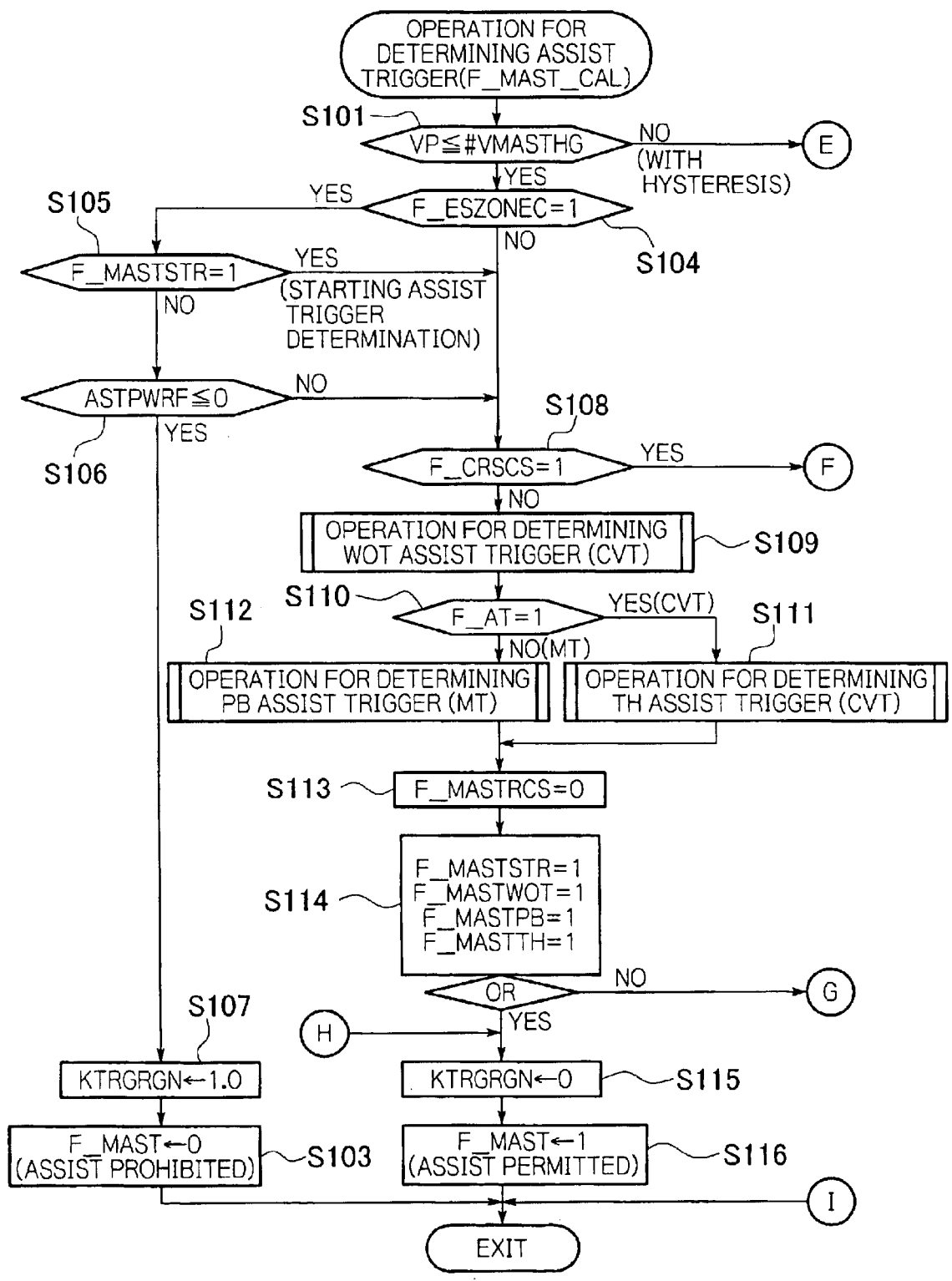
FIG. 4 is a flowchart showing the operation for determining an assist trigger.
Figure 5:
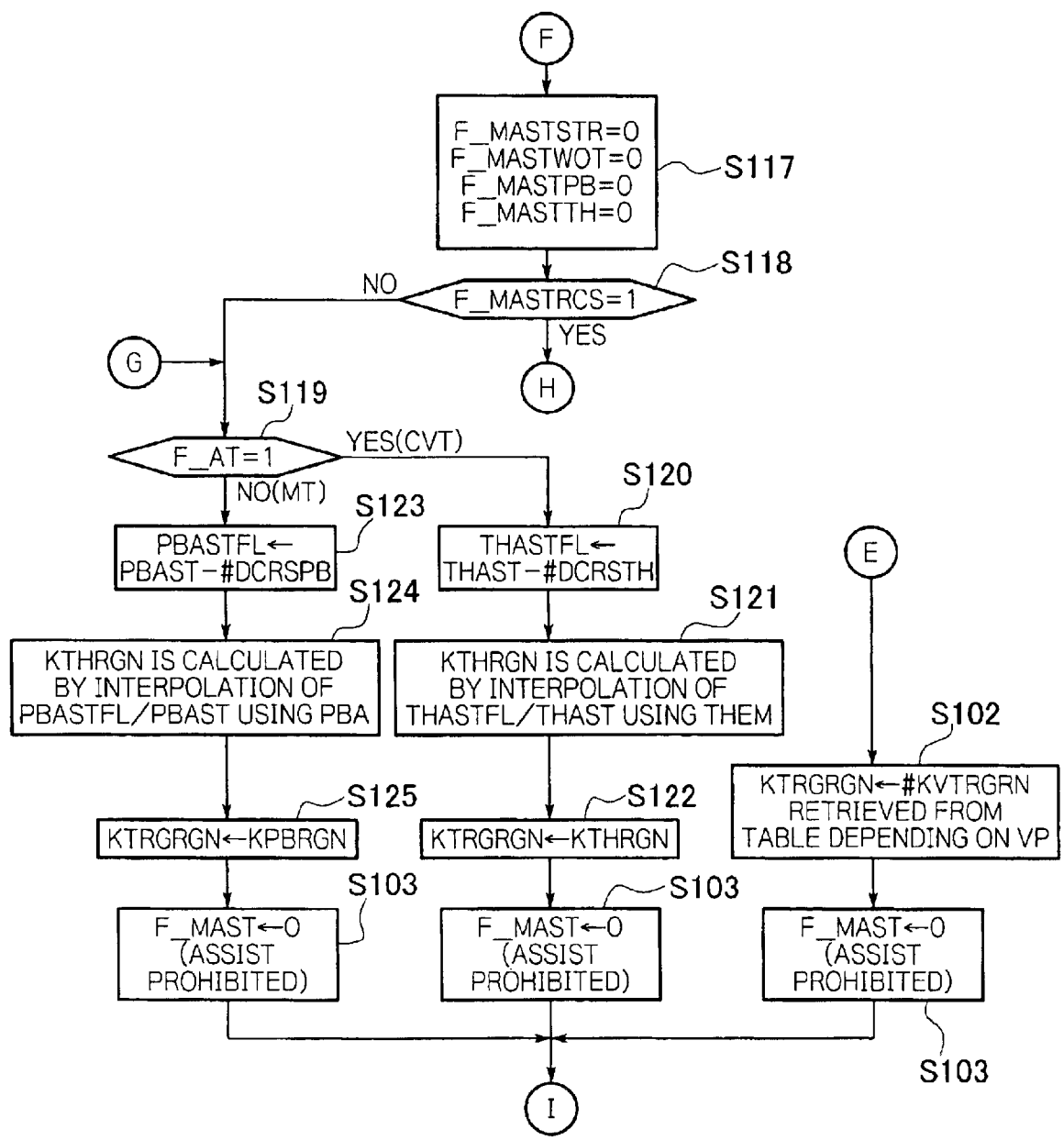
FIG. 5 is also a flowchart showing the operation for determining the assist trigger.
Figure 6:
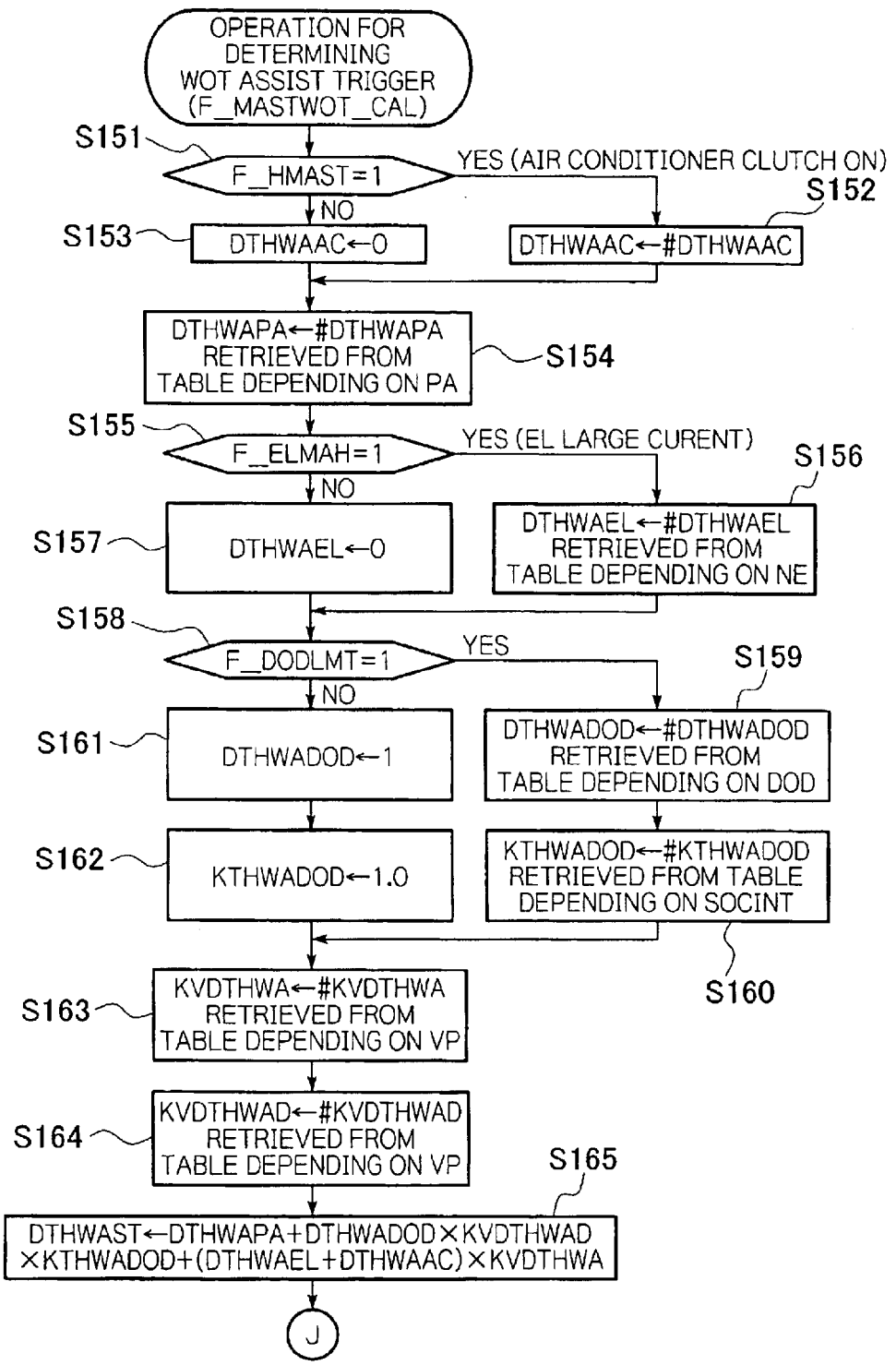
FIG. 6 is a flowchart showing the operation for determining a WOT assist trigger.
Figure 7:
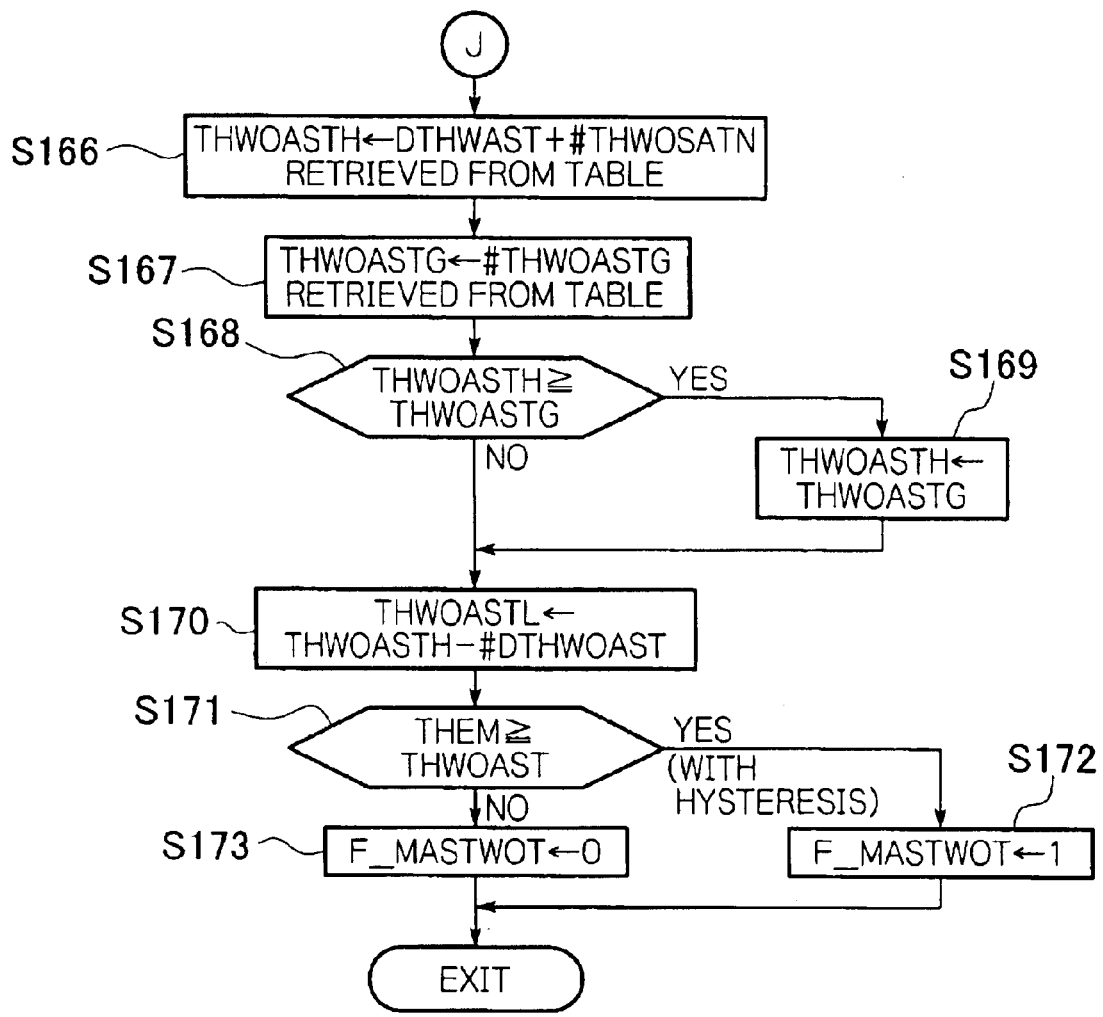
FIG. 7 is also a flowchart showing the operation for determining the WOT assist trigger.
Figure 8:
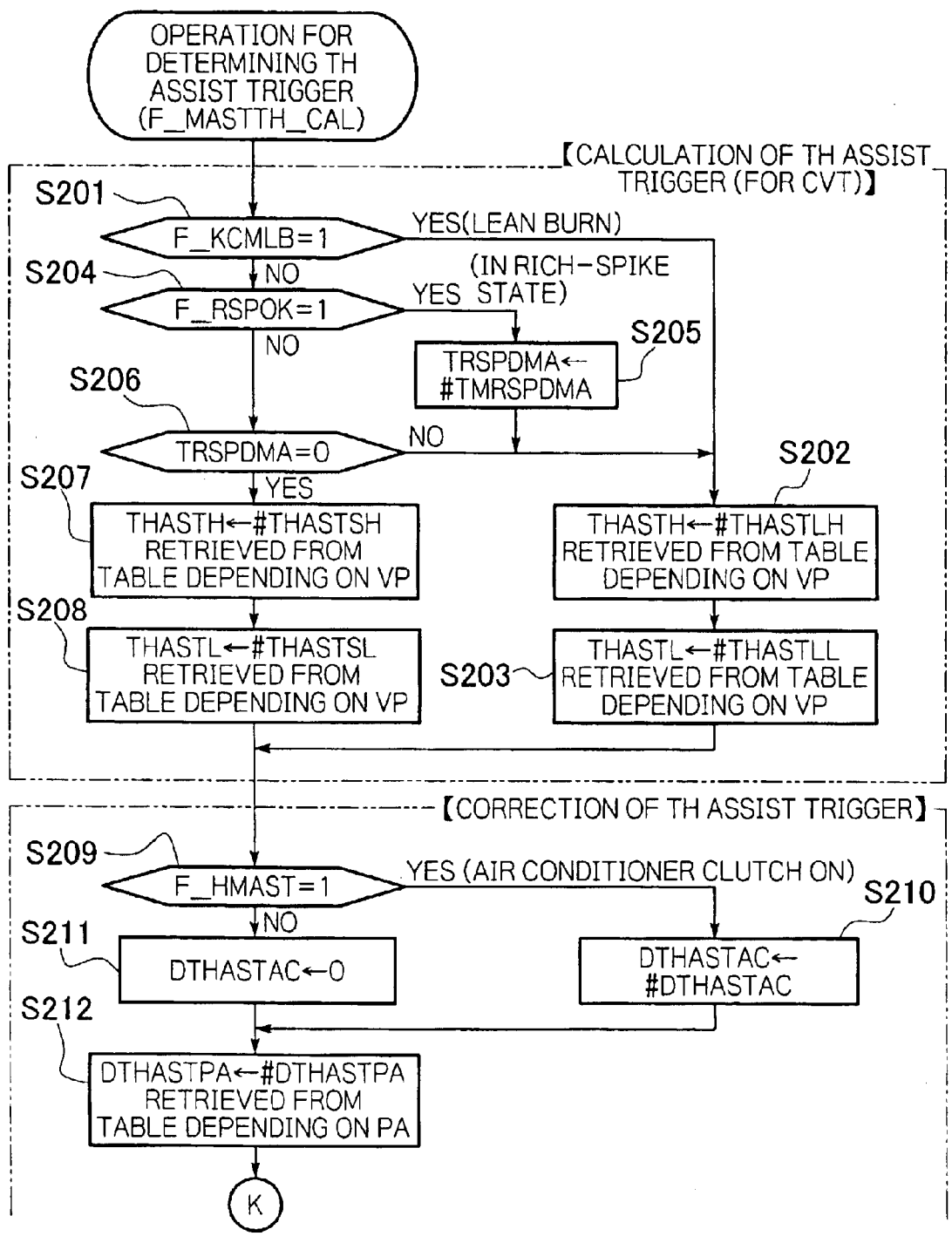
FIG. 8 is a flowchart showing the operation for determining a TH assist trigger.
Figure 9:
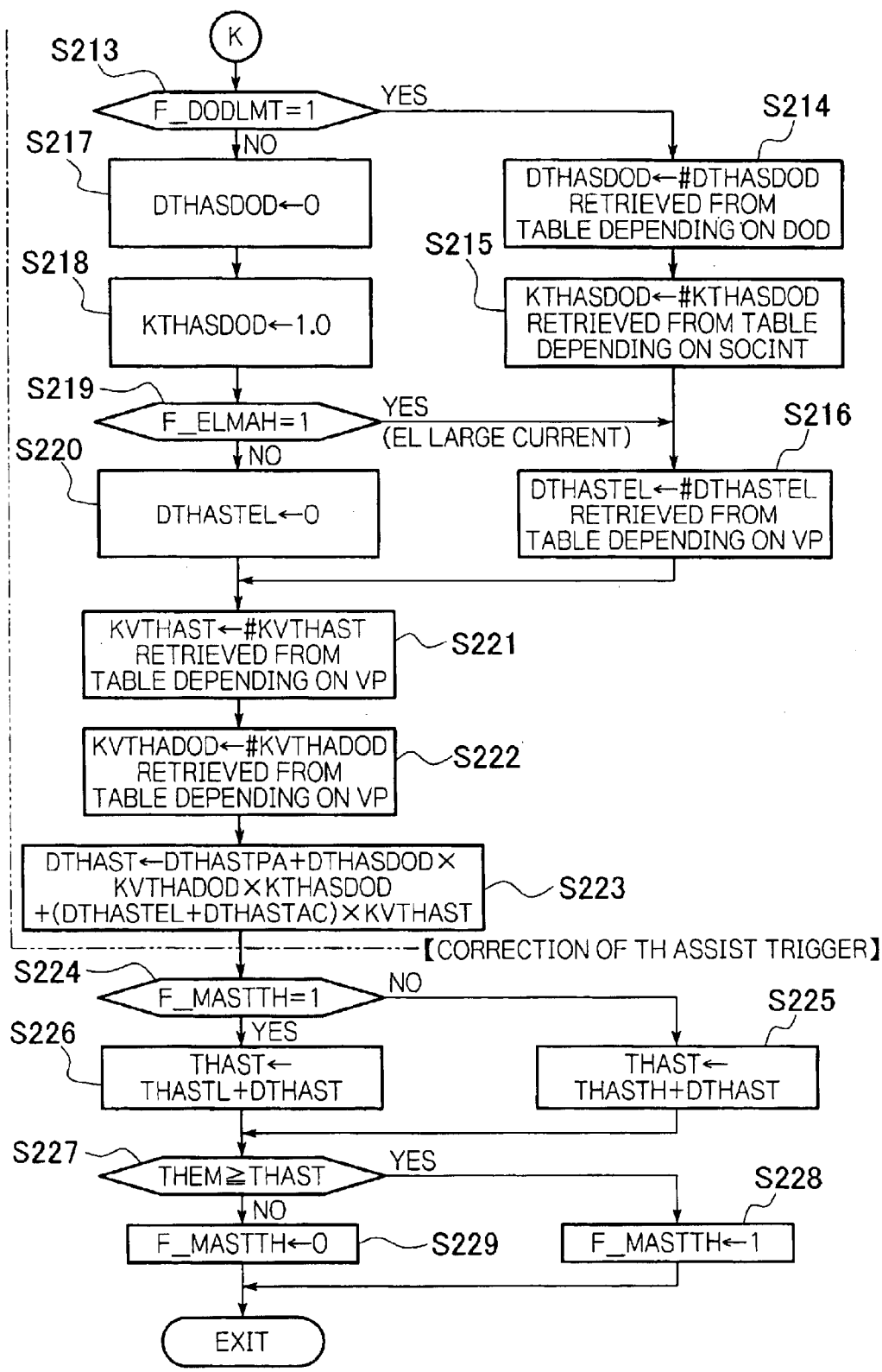
FIG. 9 is also a flowchart showing the operation for determining the TH assist trigger.
Figure 10:
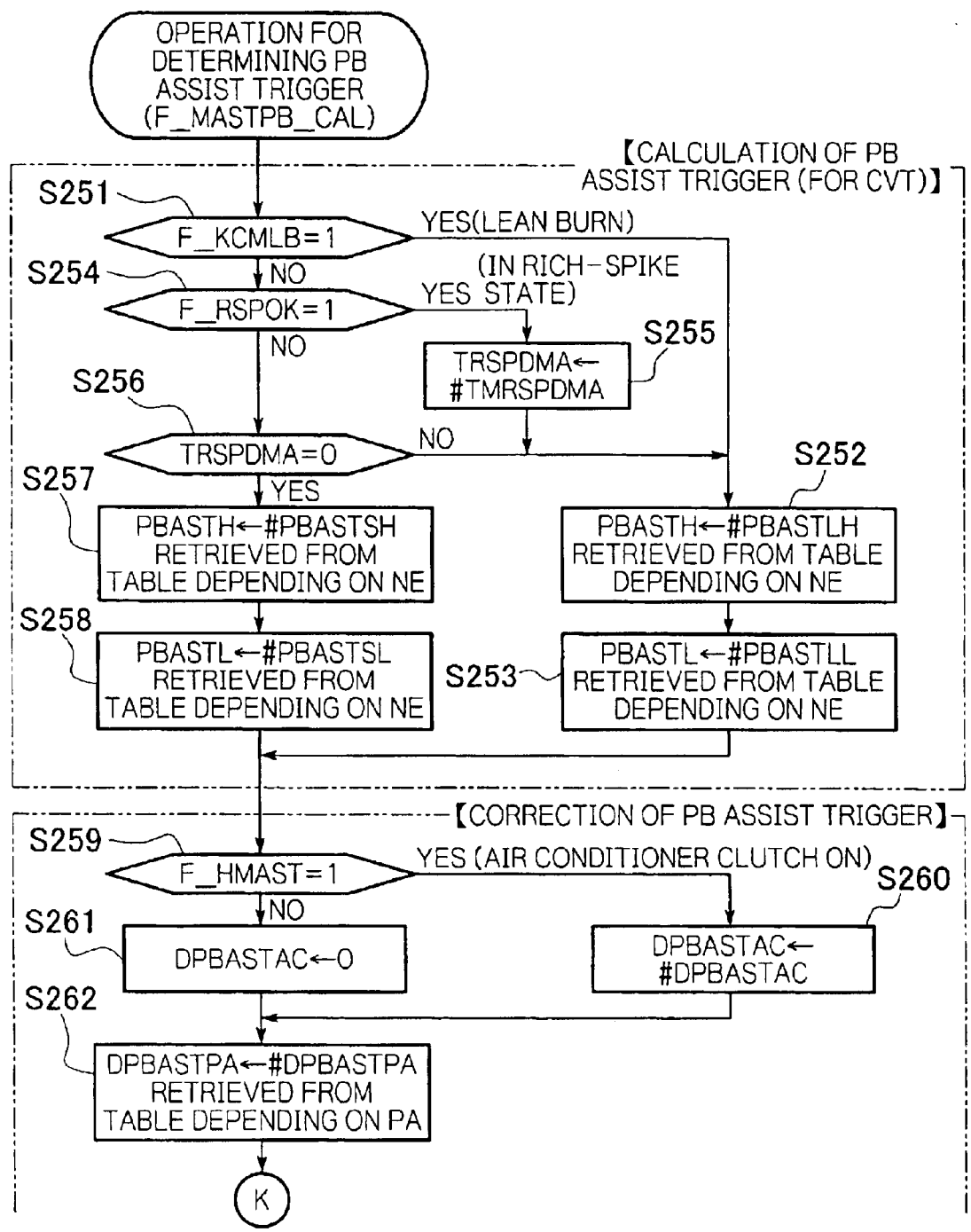
FIG. 10 is a flowchart showing the operation for determining a PB assist trigger.
Figure 11:
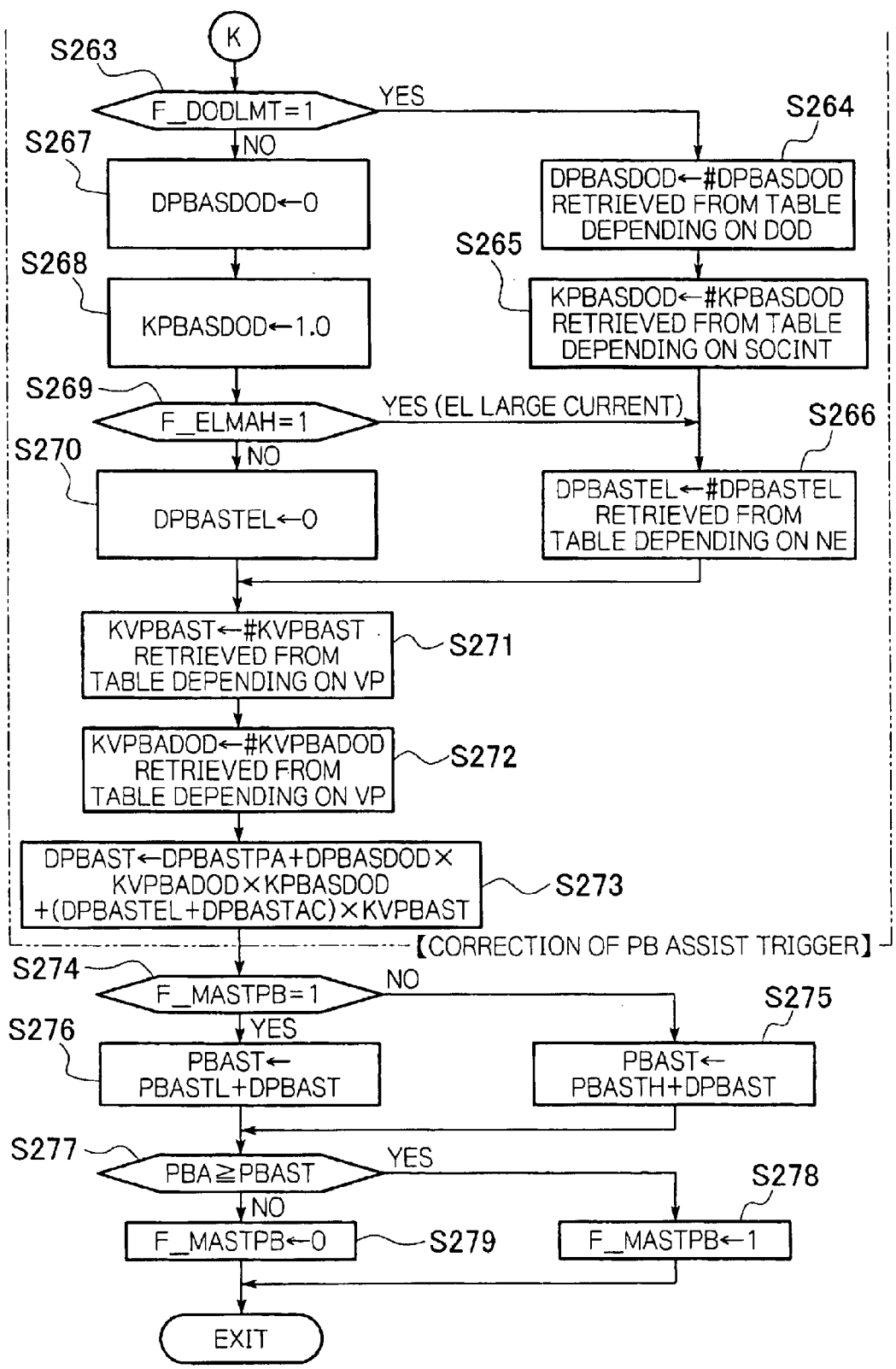
FIG. 11 is also a flowchart showing the operation for determining the PB assist trigger.

An operation for determining assist trigger for setting the motor assist indication flag F_MAST which is referred to in the above-explained step S055, more specifically, an operation in which the assist or cruise mode is selected based on the zones, will be explained below with reference to FIGS. 4 to 11. FIGS. 4 and 5 are flowcharts showing the operation for determining the assist trigger, FIGS. 6 and 7 are flowcharts showing the operation for determining the WOT assist trigger, FIGS. 8 and 9 are flowcharts showing the operation for determining the TH assist trigger, FIGS. 10 and 11 are flowcharts showing the operation for determining the PB assist trigger.

First, in step S010 shown in FIG. 4, it is determined whether the vehicle speed VP is equal to or below the highest vehicle speed for assist trigger retrieval #VMASTHG. Note that the highest vehicle speed for assist trigger retrieval #VMASTHG includes hysteresis.

When the result of the determination is "NO", the operation proceeds to step S102, in which a correcting coefficient #KVTRGRN for an amount of charge during high speed travel, which increases between the lowest value and the highest value as the vehicle speed VP is increased, is retrieved from a table, and a subtraction coefficient KTRGRGN for an amount of cruise generation is calculated.

Then, the operation proceeds to step S103, in which an assist prohibition is set by setting the motor assist indication flag F_MAST to "0", and the control operation is terminated.

On the other hand, when the result of the determination in step S101 is "YES", the operation proceeds to step S104, in which it is determined whether the value of an energy storage zone C flag F_ESZONEC is "1".

When the result of the determination is "YES", which means that the state of charge of the battery SOC is in the zone C, the operation proceeds to step S105. When the result of the determination is "NO", the operation proceeds to step S108, which will be explained below.

In step S105, it is determined whether a starting assist indication flag F_MASTSTR, which is used for determining whether the engine E should be assisted at starting of the vehicle, is "1". When the result of the determination is "YES", which means that a starting assist trigger is enacted, the operation proceeds to step S108, which will be explained below. In contrast, when the result of the determination is "NO", the operation proceeds to step S106.

In step S106, it is determined whether the final assist command ASTPWRF is equal to or below "0".

When the result of the determination is "YES", which means that the final assist command ASTPWRF is equal to or below "0", the operation proceeds to step S107, in which 1.0 is substituted into the subtraction coefficient KTRGRGN for an amount of cruise generation, and the operation proceeds to step S103, which was explained above. In contrast, when the result of the determination is "NO", the operation proceeds to step S108.

In step S108, it is determined whether a cylinder deactivation execution flag F_CRSCS during cruise is "1". This flag is used for altermiating the cylinder deactivation operation and the normal operation in which all cylinders are activated during the cruise mode.

When the result of the determination is "YES", which means that the cylinder deactivation operation is executed, the operation proceeds to step S117, which will be explained below.

In contrast, when the result of the determination is "NO", the operation proceeds to step S109.

Note that the cylinder deactivation operation is an operation in which the intake valves and exhaust valves of the engine are closed under predetermined conditions using a variable valve timing mechanism VT, and is performed to reduce the friction of the engine and to increase the amount of regenerated energy.

In step S109, the value of a WOT motor assist indication flag F_MASTWOT is determined by executing an operation for determination of the WOT assist trigger, which will be explained below. The flag F_MASTWOT is used to determine whether the engine E should be assisted when the engine E is in a WOT (wide open throttle with increased fuel) control mode in which the amount of fuel supplied to the engine E is increased by an amount defined by wide open increasing coefficient KWOT and the power of the engine E is increased.

In step S110, it is determined whether the value of an MT/CVT indication flag F_AT is "1".

When the result of the determination is "YES", which means that the present vehicle employs a CVT, the operation proceeds to step S111 in which the value of a throttle motor assist indication flag F_MASTTH is determined by executing an operation for determination of the TH assist trigger, which will be explained below, and the operation proceeds to step S113. The flag F_MASTTH is used to determine whether the engine E should be assisted in accordance with the degree of throttle opening TH.

In contrast, when the result of the determination is "NO", which means that the present vehicle employs an MT, the operation proceeds to step S112 in which the value of an intake negative pressure motor assist indication flag F_MASTPB is determined by executing an operation for determination of the PB assist trigger, which will be explained below, and the operation proceeds to step S113. The flag F_MASTPB is used to determine whether the engine E should be assisted in accordance with the intake negative pressure PB.

In step S113, the value of a cruise cylinder deactivation motor assist indication flag F_MASTRCS is set to "0". The flag F_MASTRCS is used to determine whether the engine E should be assisted when the engine E is in the cruise mode and the cylinder deactivation operation is executed.

In step S114, it is determined whether the value of any of the starting assist indication flag F_MASTSTR, WOT motor assist indication flag F_MASTWOT, intake negative pressure motor assist indication flag F_MASTPB, and throttle motor assist indication flag F_MASTTH is "1".

When the result of the determnination is "YES", the operation proceeds to step S119. In contrast, when the result of the determination is "NO", the operation proceeds to step S1 15. In step S115, "0" is substituted into the subtraction coefficient KTRGRGN for an amount of cruise generation, and the operation proceeds to step S116, in which an assist allowance is set by setting the motor assist indication flag F_MAST to "1", and the control operation is terminated.

In step S117, each of the starting assist indication flag F_MASTSTR, WOT motor assist indication flag F_MASTWOT, intake negative pressure motor assist indication flag F_MASTPB, and throttle motor assist indication flag F_MASTTH is set to "0".

In step S118, it is determined whether the value of the cruise cylinder deactivation motor assist indication flag F_MASTRCS has been set to "1".

When the result of the determination is "YES", the operation proceeds to step S115, which was explained above. In contrast, when the result of the determination is "NO", the operation proceeds to step S119.

In step S119, it is determined whether the value of the MT/CVT indication flag F_AT is "1".

When the result of the determination is "NO", which means that the present vehicle employs an MT, the operation proceeds to step S123, which will be explained below.

In contrast, when the result of the determination is "YES", which means that the present vehicle employs a CVT, the operation proceeds to step S120 in which a throttle assist trigger lowest threshold THASTFL is calculated by subtracting delta value #DCRSTH for a predetermined degree of throttle opening from a throttle assist trigger threshold THAST.

In step S121, the throttle assist trigger threshold THAST, which increases as the engine revolution increases, and the throttle assist trigger lowest threshold THASTFL are calculated at the present value THEM of the degree of throttle opening TH by using an interpolation method. A cruise generation subtraction coefficient KTHRGN for throttle is set so as to decrease between the throttle assist trigger lowest threshold THASTFL and the throttle assist trigger threshold THAST.

In step S122, the cruise generation subtraction coefficient KTHRGN for throttle is substituted into the subtraction coefficient KTRGRGN for an amount of cruise generation, and the operation proceeds to step S103, which was explained above.

In step S123, an intake passage negative pressure assist trigger lowest threshold PBASTFL is calculated by subtracting a predetermined delta value #DCRSPB of intake passage negative pressure from an intake passage negative pressure assist trigger threshold PBAST.

In step S124, the intake passage negative pressure assist trigger threshold PBAST, which increases as the engine revolution NE increases, and the intake passage negative pressure assist trigger lowest threshold PBASTFL are calculated at the present value PBA of the intake passage negative pressure PB by using an interpolation method. A cruise generation subtraction coefficient KPBRGN for intake negative pressure is set so as to decrease between the intake passage negative pressure assist trigger lowest threshold PBASTFL and the intake passage negative pressure assist trigger threshold PBAST.

In step S125, the cruise generation subtraction coefficient KPBRGN for intake negative pressure is substituted into the subtraction coefficient KTRGRGN for an amount of cruise generation, and the operation proceeds to step S103, which was explained above.

Operation for Determination of WOT Assist Trigger

The operation for determination of WOT assist trigger in the above-mentioned step S109, in which it is determined whether or not an assist operation should be executed, i.e., which should be executed an assist operation or cruise charging, based on the degree of throttle opening TH, will be explained below.

First, in step S151 shown in FIG. 6, it is determined whether the value of an air conditioner clutch ON flag F_HMAST is "1".

When the result of the determination is "YES", which means that the air conditioner clutch is ON, the operation proceeds to step S152, in which a predetermined value #DTHWAAC is substituted into a correcting coefficient DTHWAAC for WOT, and then the operation proceeds to step S154.

In contrast, when the result of the determination is "NO", which means that the air conditioner clutch is OFF, the operation proceeds to step S153, in which "0" is substituted into the correcting coefficient DTHWAAC for WOT, and then the operation proceeds to step S154. By this operation, the motor assist threshold is raised.

Next, in step S154, an atmospheric pressure correcting coefficient DTHWAPA for WOT, which decreases depending on atmospheric pressure PA as the altitude decreases, is retrieved from a table.

Next, in step S155, it is determined whether the value of a large electrical current flag F_ELMAH is "1".

When the result of the determination is "YES", which means that a large electrical current is present, the operation proceeds to step S156, in which a large electrical current correcting coefficient DTHWAEL for WOT, which decreases as the engine revolution increases, is retrieved from a table, and then the operation proceeds to step S158.

In contrast, when the result of the determination is "NO", the operation proceeds to step S157, in which "0" is substituted into the large electrical current correcting coefficient DTHWAEL for WOT, and then the operation proceeds to step S158.

In step S158, it is determined whether or not the degree of discharge of the battery DOD is limited by determining whether the value of a DOD limit indication flag F_DODLMT is "1".

In a control mode in which the degree of discharge is limited, when the state of charge of the battery SOC tends to decrease, and when the SOC reaches a predetermined lowest threshold SOCLMTL, the state of charge of the battery SOC is controlled so as to increase. Therefore, by raising the assist trigger threshold which is used for determining whether or not an acceleration operation is executed, the frequency of acceleration operation is decreased, and the frequency of charging in the cruise mode is increased; thus the battery is placed in a charging tendency. Note that the degree of discharge of the battery DOD indicates how far the present state of charge of the battery SOC is deviated toward the discharge side from an initial state of charge of the battery SOCINT.

When the result of the determination in step S158 is "YES", the operation proceeds to step S159, in which a DOD limit control mode correcting coefficient DTHWADOD for WOT, which increases as the degree of discharge of the battery DOD increases, is retrieved from a table, and then the operation proceeds to step S160. In step S160, a DOD limit control mode initial value correcting coefficient KTHWADOD for WOT, which decreases as the initial state of charge of the battery SOCINT increases, is retrieved from a table, and then the operation proceeds to step S163.

In contrast, when the result of the determination in step S158 is "NO", the operation proceeds to step S161, in which "0" is substituted into the DOD limit control mode correcting coefficient DTHWADOD for WOT, and then the operation proceeds to step S162.

In step S162, "1.0" is set in the DOD limit control mode initial value correcting coefficient KTHWADOD for WOT, and the operation proceeds to step S163.

In step S163, WOT assist trigger load correction amount vehicle speed correcting coefficient KVDTHWA, which is set so as to increase as the vehicle speed VP increases, is retrieved from a table. By using this correcting coefficient, the raised amount of the assist trigger threshold is increased as the vehicle speed is higher.

Next, in step S164, WOT assist trigger DOD correction amount vehicle speed correcting coefficient KVDTHWAD, which is set so as to increase as the vehicle speed VP increases, is retrieved from a table.

In step S165, a WOT assist trigger correcting value DTHWAST is calculated based on the atmospheric pressure correcting coefficient DTHWAPA for WOT, the DOD limit control mode correcting coefficient DTHWADOD for WOT, the WOT assist trigger DOD correction amount vehicle speed correcting coefficient KVDTHWAD, the DOD limit control mode initial value correcting coefficient KTHWADOD for WOT, the large electrical current correcting coefficient DTHWAEL for WOT, the air conditioner correcting coefficient DTHWAAC for WOT, and the WOT assist trigger load correction amount vehicle speed correcting coefficient KVDTHWA.

Next, in step S166, a threshold THWOASTN, which is a reference value for the WOT assist trigger, is retrieved from a WOT assist trigger table depending on the engine revolution NE, and a value obtained by adding the WOT assist trigger correcting value DTHWAST to the threshold THWOASTN is set as a WOT high assist trigger threshold THWOASTH.

Next, in step S167, a WOT assist trigger upper limit value THWOASTG is retrieved from a WOT assist trigger upper limit table in which values vary depending on the engine revolution NE.

In step S168, it is determined whether the WOT high assist trigger threshold THWOASTH is equal to or greater than the WOT assist trigger upper limit value THWOASTG.

When the result of the determination is "NO", the operation proceeds to step S170.

In contrast, when the result of the determination is "YES", the operation proceeds to step S169 in which the WOT assist trigger upper limit value THWOASTG is set in the WOT high assist trigger threshold THWOASTH, and then the operation proceeds to step S170.

In step S170, a WOT low assist trigger threshold THWOASTL is calculated by subtracting a predetermined difference #DTHWOAST, which is used for setting hysteresis, from the WOT high assist trigger threshold THWOASTH.

In step S171, it is determined whether the present degree of throttle opening TH is equal to or greater than the WOT assist trigger threshold THWOAST.

Note that the WOT assist trigger threshold THWOAST includes hysteresis, and the WOT high assist trigger threshold THWOASTH is referenced when the degree of throttle opening TH is increasing, and the WOT low assist trigger threshold THWOASTL is referenced when the degree of throttle opening TH is decreasing.

When the result of the determination in step 171 is "YES", the operation proceeds to step S171 in which the WOT motor assist indication flag F_MASTWOT is set to "1", and the control operation is terminated.

In contrast, when the result of the determination in step 171 is "NO", the operation proceeds to step S173 in which the WOT motor assist indication flag F_MASTWOT is set to "0", and the control operation is terminated.

Operation for determination of TH (throttle) assist trigger

The operation for determination of TH assist trigger in the above-mentioned step S111, in which it is determined whether or not an assist operation should be executed, i.e., which should be executed an assist operation or cruise charging, based on the degree of throttle opening TH, will be explained below.

First, in step S201 shown in FIG. 8, it is determined whether the value of a lean burn indication flag F_KCMLB, which is set based on a target air-fuel ratio coefficient KCND used for controlling, for example, a fuel injection valve (not shown), is "1". Note that the target air-fuel ratio coefficient KCND is in proportion with a fuel-air ratio, which is the inverse number of the air-fuel ratio, and indicates the theoretical air-fuel ratio when it is 1.0.

When the result of the determination in step S201 is "YES", which means that the air-fuel ratio of the air-fuel mixture being supplied to the engine E is leaner than the theoretical air-fuel ratio, i.e., the engine is operated under lean burn conditions, the operation proceeds to step S202.

In step S202, an upper side TH assist trigger table value (lean burn) #THASTLH, which varies depending on the vehicle speed VP, is retrieved from a table, and an upper threshold THASTH of the throttle assist trigger is obtained.

Next, in step S203, a lower side TH assist trigger table value (lean burn) #THASTLL, which varies depending on the vehicle speed VP, is retrieved from a table, and a lower threshold THASTL of the throttle assist trigger is obtained, and then the operation proceeds to step S209, which will be explained below.

Note that the throttle assist trigger table defines the upper threshold THASTLH of the throttle assist trigger and the lower threshold THASTLL of the throttle assist trigger which are used for determination whether assist by motor should be executed with respect to the vehicle speed VP.

The throttle motor assist indication flag F_MASTTH is altered from "0" to "1"when the upper threshold THASTLH of the throttle assist trigger is passed from below thereof to above thereof as the degree of throttle opening TH increases, or as the vehicle speed VP decreases, in contrast, the throttle motor assist indication flag F_MASTTH is changed from "1" to "0" when the lower threshold THASTLL of the throttle assist trigger is passed from above thereof to below thereof as the degree of throttle opening TH decreases, or as the vehicle speed VP increases. Moreover, the throttle assist trigger table is changed in accordance with each of the gear positions, and whether or not the engine is operated under lean burn conditions.

On the other hand, when the result of the determination in step S201 is "NO", which means that the air-fuel ratio of the air-fuel mixture being supplied to the engine E is equal to the theoretical air-fuel ratio, or is richer than the theoretical air-fuel ratio, the operation proceeds to step S204.

In step S204, it is determined whether the value of a rich-spike indication flag F_RSPOK, which indicates whether or not the engine is operated under rich-spike conditions, is "1". Note that "under rich-spike conditions" means a fuel combustion state in which a rich burn is performed in a very short period.

When the result of the determination is "YES", which means that the engine is operated under rich-spike conditions, the operation proceeds to step S205.

In step S205, a predetermined rich-spike determination delay time #TMRSPDMA is substituted into a rich-spike determination timer TRSPDMA, and the operation proceeds to step S202, which was explained above.

In contrast, when the result of the determination in step S204 is "NO", which means that the engine is not operated under rich-spike conditions, the operation proceeds to step S206.

In step S206, it is determined whether the timer value of the rich-spike determination timer TRSPDMA is "0". When the result of the determination in step S204 is "NO", the operation proceeds to step S202.

In contrast, when the result of the determination is "YES", the operation proceeds to step S207.

In step S207, an upper side TH assist trigger table value (stoichiometric burn) #THASTSH, which varies depending on the vehicle speed VP, is retrieved from the throttle assist trigger table, and an upper threshold THASTH of the throttle assist trigger is obtained.

Next, in step S208, a lower side TH assist trigger table value (stoichiometric burn) #THASTSL, which varies depending on the vehicle speed VP, is retrieved from the throttle assist trigger table, and a lower threshold THASTHL of the throttle assist trigger is obtained, and the operation proceeds to step S209.

In step S209, it is determined whether the value of an air conditioner clutch ON flag F_HMAST is "1".

When the result of the determination is "YES", which means that the air conditioner clutch is ON, the operation proceeds to step S210 in which a predetermined value #DTHASTAC is substituted into an air conditioner correcting coefficient DTRHASTAC for TH, and then the operation proceeds to step S212.

In contrast, when the result of the determination is "NO", which means that the air conditioner clutch is OFF, the operation proceeds to step S211, in which "0" is substituted into air conditioner correcting coefficient DTHASTAC for TH, and then the operation proceeds to step S212. By this operation, the motor assist threshold is raised.

Next, in step S212, an atmospheric pressure correcting coefficient DTHASTPA for TH, which decreases depending on atmospheric pressure PA as the altitude decreases, is retrieved from a table.

In step S213, it is determined whether the value of the DOD limit indication flag F_DODLMT is "1".

When the result of the determination is "YES", the operation proceeds to step S214 in which a DOD limit control mode correcting coefficient DTHASDOD for TH, which increases as the degree of discharge of the battery DOD increases, is retrieved from a table, and then the operation proceeds to step S215. In step S215, a DOD limit control mode initial value correcting coefficient KTHASDOD for TH, which decreases as the initial state of charge of the battery SOCINT increases, is retrieved from a table, and then the operation proceeds to step S216. In step S216, a large electrical current correcting coefficient DTHASTEL for TH, which decreases as the vehicle speed VP increases, is retrieved from a table, and then the operation proceeds to step S221.

In contrast, when the result of the determination in step S213 is "NO", the operation proceeds to step S217 in which "0" is substituted into the DOD limit control mode correcting coefficient DTHASDOD for TH, and then the operation proceeds to step S218. In step S218, "1.0" is set in the DOD limit control mode initial value correcting coefficient KTHASDOD for TH, and the operation proceeds to step S219.

Next, in step S219, it is determined whether the value of the large electrical current flag F_ELMAH is "1".

When the result of the determination is "YES", which means that a large electrical current is present, the operation proceeds to step S216, which was explained above. In contrast, when the result of the determination is "NO", the operation proceeds to step S220 in which "0" is substituted into the large electrical current correcting coefficient DTHASTEL for TH, and then the operation proceeds to step S221.

In step S221, a throttle assist trigger load correction amount vehicle speed correcting coefficient KVTHAST, which is set so as to increase as the vehicle speed VP increases, is retrieved from a table. By using this correcting coefficient, the raised amount of the assist trigger threshold is increased as the vehicle speed is higher.

Next, in step S222, a throttle assist trigger DOD correction amount vehicle speed correcting coefficient KVTHADOD, which is set so as to increase as the vehicle speed VP increases, is retrieved from a table.

In step S223, a throttle assist trigger correcting value DTHAST is calculated based on the atmospheric pressure correcting coefficient DTHASTPA for TH, the DOD limit control mode correcting coefficient DTHASDOD for TH, the TH assist trigger DOD correction amount vehicle speed correcting coefficient KVTHADOD, the DOD limit control mode initial value correcting coefficient KTHASDOD for TH, the large electrical current correcting coefficient DTHASTEL for TH, the air conditioner correcting coefficient DTHASTAC for TH, and the throttle assist trigger load correction amount vehicle speed correcting coefficient KVTHAST.

In step S224, it is determined whether the value of the throttle motor assist indication flag F_MASTTH is "1".

When the result of the determination is "NO", the operation proceeds to step S225 in which a value obtained by adding the throttle assist trigger correcting value DTHAST to the throttle high assist trigger threshold THASTH is set as a throttle assist trigger threshold THAST, then the operation proceeds to step S227.

In contrast, when the result of the determination is "YES", the operation proceeds to step S226 in which a value obtained by adding the throttle assist trigger correcting value DTHAST to the throttle low assist trigger threshold THASTL is set as a throttle assist trigger threshold THAST, then the operation proceeds to step S227.

In step S227, it is determined whether the present degree of throttle opening TH is equal to or greater than the throttle assist trigger threshold THAST.

When the result of the determination is "YES", the operation proceeds to step S228 in which the throttle motor assist indication flag F_MASTTH is set to "1", and the control operation is terminated.

In contrast, when the result of the determination is "NO", the operation proceeds to step S229 in which the throttle motor assist indication flag F_MASMTH is set to "0", and the control operation is terminated.

Operation for Determination of PB (Intake Passage Negative Pressure) Assist Trigger The operation for determination of TH assist trigger. in the above-mentioned step S112, in which it is determined whether or not an assist operation should be executed, i.e., it is determined which should be executed, an assist operation or a cruise charging, based on the intake passage negative pressure PB, will be explained below.

First, in step S251 shown in FIG. 10, it is determined whether the value of the lean burn indication flag F_KCMLB is "1".

When the result of the determination is "YES", which means that the air-fuel ratio of the air-fuel mixture being supplied to the engine E is leaner than the theoretical air-fuel ratio, i.e., the engine is operated under lean burn conditions, and the operation proceeds to step S252.

In step S252, an upper side PB assist trigger table value (lean burn) #PBASTLH, which varies depending on the engine revolution NE, is retrieved from a table, and an upper threshold PBASTH of the intake passage negative pressure assist trigger is obtained.

Next, in step S253, a lower side PB assist trigger table value (lean burn) #PBASTLL, which varies depending on engine revolution NE, is retrieved from a table, and a lower threshold THASTL of the intake passage negative pressure assist trigger is obtained, and then the operation proceeds to step S259, which will be explained below.

Note that the intake passage negative pressure assist trigger table defines the upper threshold PBASTLH of the intake passage negative pressure assist trigger and the lower threshold PBASTLL of the intake passage negative pressure assist trigger which are used for determination whether assist by motor should be executed with respect to the engine revolution NE.

The intake passage negative pressure motor assist indication flag F_MASTPB is changed from "0" to "1" when the upper threshold PBASTLH of the intake passage negative pressure assist trigger is passed from below thereof to above thereof as the absolute value of the intake passage negative pressure PB increases, or as the engine revolution NE decreases, and in contrast, the intake passage negative pressure motor assist indication flag F_MASTPB is changed from "1" to "0" when the lower threshold PBASTLL of the intake passage negative pressure assist trigger is passed from above thereof to below thereof as absolute value of the intake passage negative pressure PB decreases, or as the engine revolution NE increases. Moreover, the intake passage negative pressure assist trigger table is changed in accordance with each of the gear positions, and whether or not the engine is operated under lean burn conditions.

On the other hand, when the result of the determination in step S251 is "NO", which means that the air-fuel ratio of the air-fluel mixture being supplied to the engine E is equal to the theoretical air-fuel ratio, or is richer than the theoretical air-fuel ratio, the operation proceeds to step S254.

In step S254, it is determined whether the value of a rich-spike indication flag F_RSPOK, which indicates whether or not the engine is operated under rich-spike conditions, is "1".

When the result of the determination is "YES", which means that the engine is operated under rich-spike conditions, the operation proceeds to step S255.

In step S255, a predetermined rich-spike determination delay time #TMRSPDMA is substituted into a rich-spike determination timer TRSPDMA, and the operation proceeds to step S252, which was explained above.

In contrast, when the result of the determination in step S254 is "NO", which means that the engine is not operated under rich-spike conditions, the operation proceeds to step S266.

In step S256, it is determined whether the timer value of the rich-spike determination timer TRSPDMA is "0". When the result of the determination in step S254 is "NO", the operation proceeds to step S252.

In contrast, when the result of the determination is "YES", the operation proceeds to step S257.

In step S257, an upper side intake passage negative pressure assist trigger table value (stoichiometric burn) #PBASTSH, which varies depending on the engine revolution NE, is retrieved from the intake passage negative pressure assist trigger table, and an upper threshold PBASTH of the intake passage negative pressure assist trigger is obtained.

Next, in step S258, a lower side intake passage negative pressure assist trigger table value (stoichiometric burn) #PBASTSL, which varies depending on the engine revolution NE, is retrieved from the intake passage negative pressure assist trigger table, and a lower threshold PBASTHL of the intake passage negative pressure assist trigger is obtained, and the operation proceeds to step S259.

In step S259, it is determined whether the value of an air conditioner clutch ON flag F_HMAST is "1".

When the result of the determination is "YES", which means that the air conditioner clutch is ON, the operation proceeds to step S260 in which a predetermined value #DPBASTAC is substituted into an air conditioner correcting coefficient DPBASTAC for PB, and then the operation proceeds to step S262.

In contrast, when the result of the determination is "NO", which means that the air conditioner clutch is OFF, the operation proceeds to step S261, in which "0" is substituted into air conditioner correcting coefficient DPBASTAC for PB, and then the operation proceeds to step S262. By this operation, the motor assist threshold is raised.

Next, in step S262, an atmospheric pressure correcting coefficient DPBASTPA for PB, which decreases depending on atmospheric pressure PA as the altitude decreases, is retrieved from a table.

In step S263, it is determined whether the value of the DOD limit indication flag F_DODLMT is "1".

When the result of the determination is "YES", the operation proceeds to step S264 in which a DOD limit control mode correcting coefficient DPBASDOD for PB, which increases as the degree of discharge of the battery DOD increases, is retrieved from a table, and then the operation proceeds to step S265. In step S265, a DOD limit control mode initial value correcting coefficient KPBASDOD for TH, which decreases as the initial state of charge of the battery SOCINT increases, is retrieved from a table, and then the operation proceeds to step S266. In step S266, a large electrical current correcting coefficient DPBASTEL for PB, which decreases as the engine revolution NE increases, is retrieved from a table, and then the operation proceeds to step S271.

In contrast, when the result of the determination in step S263 is "NO", the operation proceeds to step S267 in which "0" is substituted into the DOD limit control mode correcting coefficient DPBASDOD for PB, and then the operation proceeds to step S268. In step S268, "1.0" is set in the DOD limit control mode initial value correcting coefficient KPBASDOD for PB, and the operation proceeds to step S269.

Next, in step S269, it is determined whether the value of the large electrical current flag F_ELMAH is "1".

When the result of the determination is "YES", which means that a large electrical current is present, the operation proceeds to step S266, which was explained above. In contrast, when the result of the determination is "NO", the operation proceeds to step S270 in which "0" is substituted into the large electrical current correcting coefficient DPBASTEL for PB, and then the operation proceeds to step S271.

In step S271, a throttle assist trigger load correction amount vehicle speed correcting coefficient KVPBAST, which is set so as to increase as the vehicle speed VP increases, is retrieved from a table. By using this correcting coefficient, the raised amount of the assist trigger threshold is increased as the vehicle speed is higher.

Next, in step S272, a throttle assist trigger DOD correction amount vehicle speed correcting coefficient KVPBADOD, which is set so as to increase as the vehicle speed VP increases, is retrieved from a table.

In step S273, an intake passage negative pressure assist trigger correcting value DPBAST is calculated based on the atmospheric pressure correcting coefficient DPBASTPA for PB, the DOD limit control mode correcting coefficient DPBASDOD for PB, the intake passage negative pressure assist trigger DOD correction amount vehicle speed correcting coefficient KVPBADOD, the DOD limit control mode initial value correcting coefficient KPBASDOD for PB, the large electrical current correcting coefficient DPBASTEL for PB, the air conditioner correcting coefficient DPBASTAC for PB, and the intake passage negative pressure assist trigger load correction amount vehicle speed correcting coefficient KVPBAST.

In step S274, it is determined whether the value of the intake passage negative pressure motor assist indication flag F_MASTPB is "1".

When the result of the determination is "NO", the operation proceeds to step S275 in which a value obtained by adding the intake passage negative pressure assist trigger correcting value DPBAST to the intake passage negative pressure high assist trigger threshold PBASTH is set as an intake passage negative pressure assist trigger threshold PBAST, and then the operation proceeds to step S277.

In contrast, when the result of the determination is "YES", the operation proceeds to step S276 in which a value obtained by adding the intake passage negative pressure assist trigger correcting value DPBAST to the intake passage negative pressure low assist trigger threshold PBASTL is set as an intake passage negative pressure assist trigger threshold PBAST, and then the operation proceeds to step S277.

In step S277, it is determined whether the absolute value PBA of the intake passage negative pressure PB is equal to or greater than the intake passage negative pressure assist trigger threshold PBAST.

When the result of the determination is "YES", the operation proceeds to step S278 in which the intake passage negative pressure motor assist indication flag F_MASTPB is set to "1", and the control operation is terminated.

In contrast, when the result of the determination is "NO", the operation proceeds to step S279 in which the intake passage negative pressure motor assist indication flag F_MASTPB is set to "0", and the control operation is terminated. Acceleration mode The control operation in the acceleration mode in the above-mentioned step S059, in which various amounts of assist are compared, and an optimum control mode is selected and output, will be explained below with reference to the appended drawings.

Figure 12:
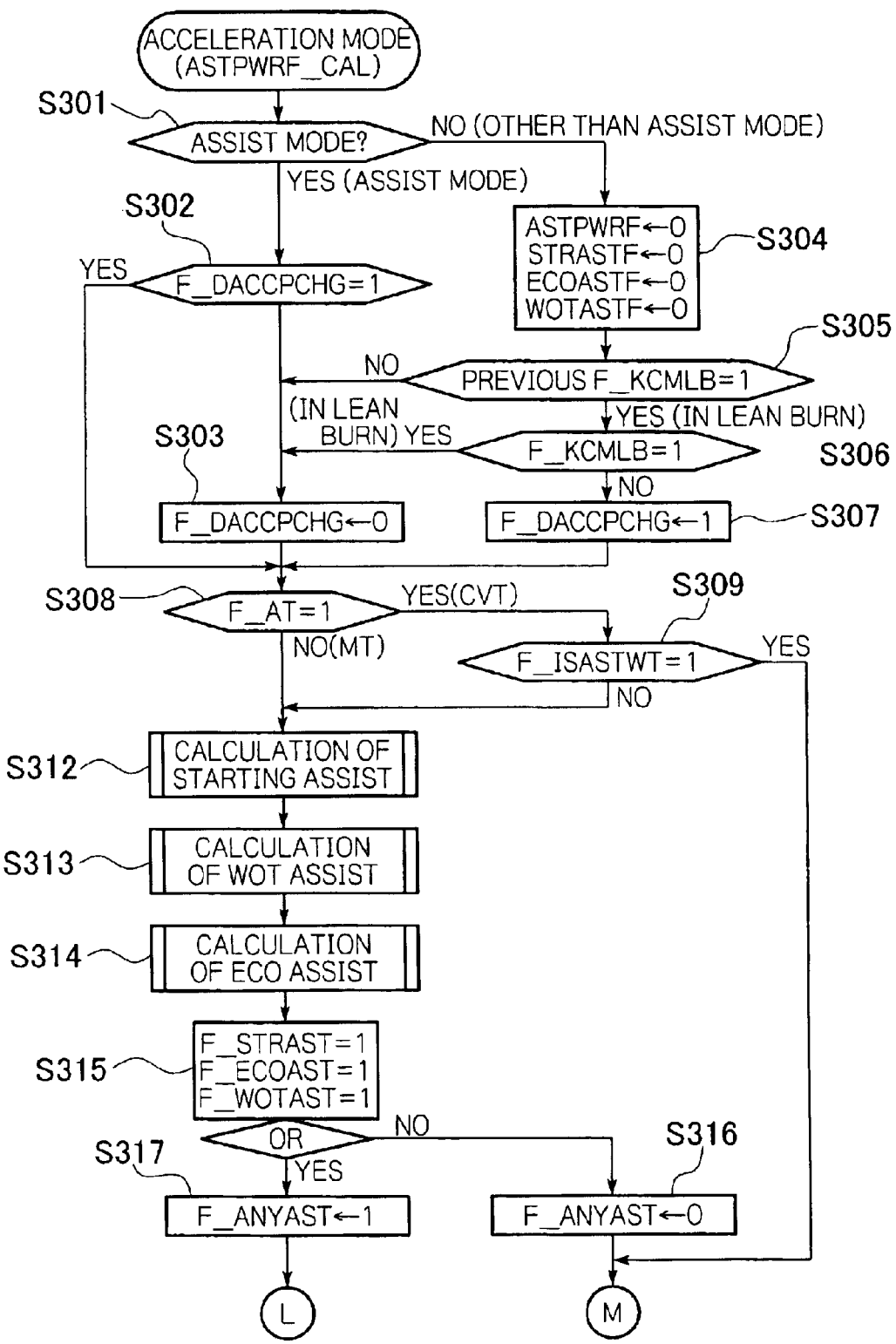
FIG. 12 is a flowchart showing the operation for an acceleration mode.
Figure 13:
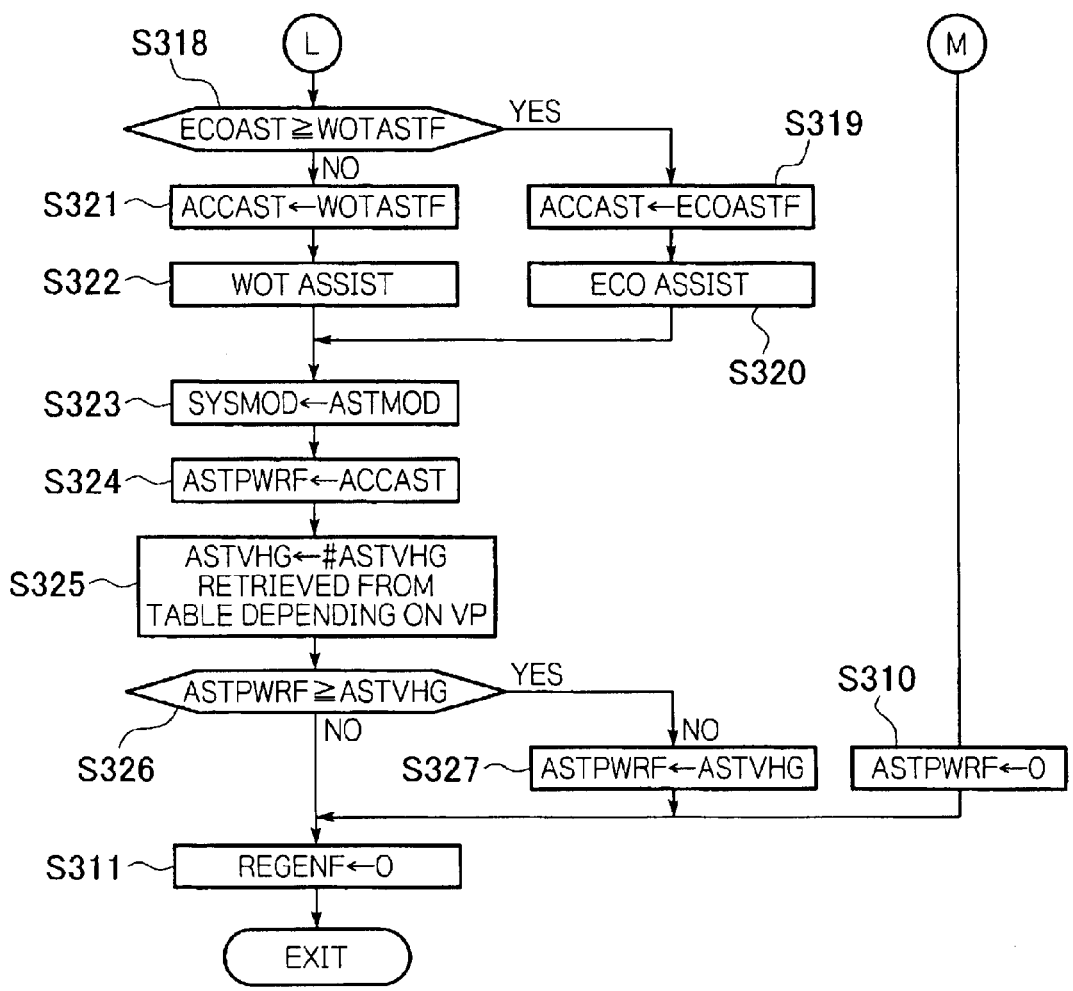
FIG. 13 is also a flowchart showing the operation for the acceleration mode.

FIGS. 12 and 13 are flowcharts showing the control operation for the acceleration mode.

First, in step S301 shown in FIG. 12, it is determined whether or not the current situation is the acceleration mode in which the engine E is assisted.

When the result of the determination is "YES", which means that the current situation is the acceleration mode in which the engine E is assisted, the operation proceeds to step S302. In contrast, when the result of the determination is "NO", which means that the current condition is not the acceleration mode, i.e., the engine E should not be assisted, the operation proceeds to step S304, which will be explained below.

In step S302, it is determined whether the value of a flag F_DACCPCHG is "1". The flag F_DACCPCHG indicates that an assist should be executed when the air-fuel ratio is switched in order to avoid rapid change in power feeling felt by the driver.

When the result of the determination is "YES", the operation proceeds to step S308, which will be explained below.

In contrast, when the result of the determination is "NO", the operation proceeds to step S303 in which the flag F_DACCPCHG is set to "0", and the operation proceeds to step S308.

In step S304, the final assist command ASTPWRF, a final starting assist command STRASTF, a final ECO assist command ECOASTF, and a final WOT assist command WOTASTF are set to "0".

In step S305, it is determined whether the value of the lean burn indication flag F_KCMLB in the previous routine was "1".

When the result of the determination is "NO", the operation proceeds to step S303 explained above.

In contrast, when the result of the determination is "YES", which means that the engine is operated under a lean burn conditions, the operation proceeds to step S306.

In step S306, it is determined whether the value of the lean burn indication flag F_KCMLB is "1".

When the result of the determination is "YES", which means that the engine is continuously operated under lean burn conditions, the operation proceeds to step S303.

In contrast, when the result of the determination is "NO", which means that the conditions have been switched from a lean burn to a stoichiometric burn, the operation proceeds to step S307 in which the flag F_DACCPCHG is set to "1", and the operation proceeds to step S308.

In step S308, it is determined whether the value of the MT/CVT indication flag F_AT is "1".

When the result of the determination is "YES", which means that the present vehicle employs a CVT, the operation proceeds to step S309 in which it is determined whether the value of an indication flag F_ISASTWTAT, which requires waiting for assist when the operation of the vehicle switched from idling stop to starting, is "1".

When the result of the determination in step S309 is "YES", the operation proceeds to step S310 in which the final assist command ASTPWRF is set to "0", and the operation proceeds to step S311 in which the final charging command REGENF is set to "0", and then the control operation is terminated.

In contrast, when the result of the determination in step S308 is "NO", which means that the present vehicle employs an MT, and when the result of the determination in step S309 is "NO", the operation proceeds to step S312.

In step S312, an operation for calculating the amount of starting assist is executed, and the final starting assist command STRASTF is calculated.

Next, in step S313, an operation for calculating the amount of WOT assist is executed, and the final WOT assist command WOTASTF is calculated.

Next, in step S314, an operation for calculating the amount of ECO assist is executed, and the ECO assist command ECOAST and the final ECO assist command ECOASTF are calculated.

Moreover, in step S315, it is determined whether the value of any of the following flags is "1": a starting assist flag F_STRAST which requires execution of a starting assist; a WOT assist flag F_WOTAST which requires execution of assist under a WOT (wide open throttle) control mode; and a ECO assist flag F_ECOAST which requires execution of assist at low load.

When the result of the determination is "NO", the operation proceeds to step S316, which will be explained below, in which an assist permission flag F_ANYAST, which indicates allowance of any of the above assists, is set to "0", and the operation proceeds to step S310 explained above.

In contrast, when the result of the determination is "YES", the operation proceeds to step S317 in which an assist permission flag F_ANYAST, which indicates allowance of any of the above assists, is set to "1", and the operation proceeds to step S318.

In step S318, it is determined whether the ECO assist command ECOAST is equal to or greater than the final WOT assist command WOTASTF.

When the result of the determination is "YES", the operation proceeds to step S319 in which the ECO assist command ECOAST is set to a normal assist command ACCAST in the acceleration mode, and the operation proceeds to step S320 in which the vehicle is deemed to be in an ECO assist state in which the engine E is assisted at low load, and then the operation proceeds to step S323.

In contrast, when the result of the determination is "NO", the operation proceeds to step S321 in which the final WOT assist command WOTASTF is set to the normal assist command ACCAST, and the operation proceeds to step S322 in which the vehicle is deemed to be in a WOT assist state in which the engine E is assisted under the WOT (wide open throttle) control mode, and then the operation proceeds to step S323.

In step S323, the system is set in an assist mode.

In step S324, the normal assist command ACCAST is set to the final assist command ASTPWRF.

In step S325, an upper limit of the amount of assist ASTVHG, which varies depending on the vehicle speed VP, is retrieved from a table.

In step S326, it is determined whether the final assist command ASTPWRF is equal to or greater than the upper limit of the amount of assist ASTVHG.

When the result of the determination is "NO", the operation proceeds to step S311 explained above.

In contrast, when the result of the determination is "YES", the operation proceeds to step S327 in which the upper limit of the amount of assist ASTVHG is set to the final assist command ASTPWRF, and the operation proceeds to step S311.

Operation for Calculating the Amount of WOT Assist

The operation for calculating the amount of WOT assist in the above-mentioned step S313, i.e., the operation for calculating the amount of assist in a zone above a critical point of the intake passage negative pressure PB, will be explained below with reference to the appended drawings.

Figure 14:
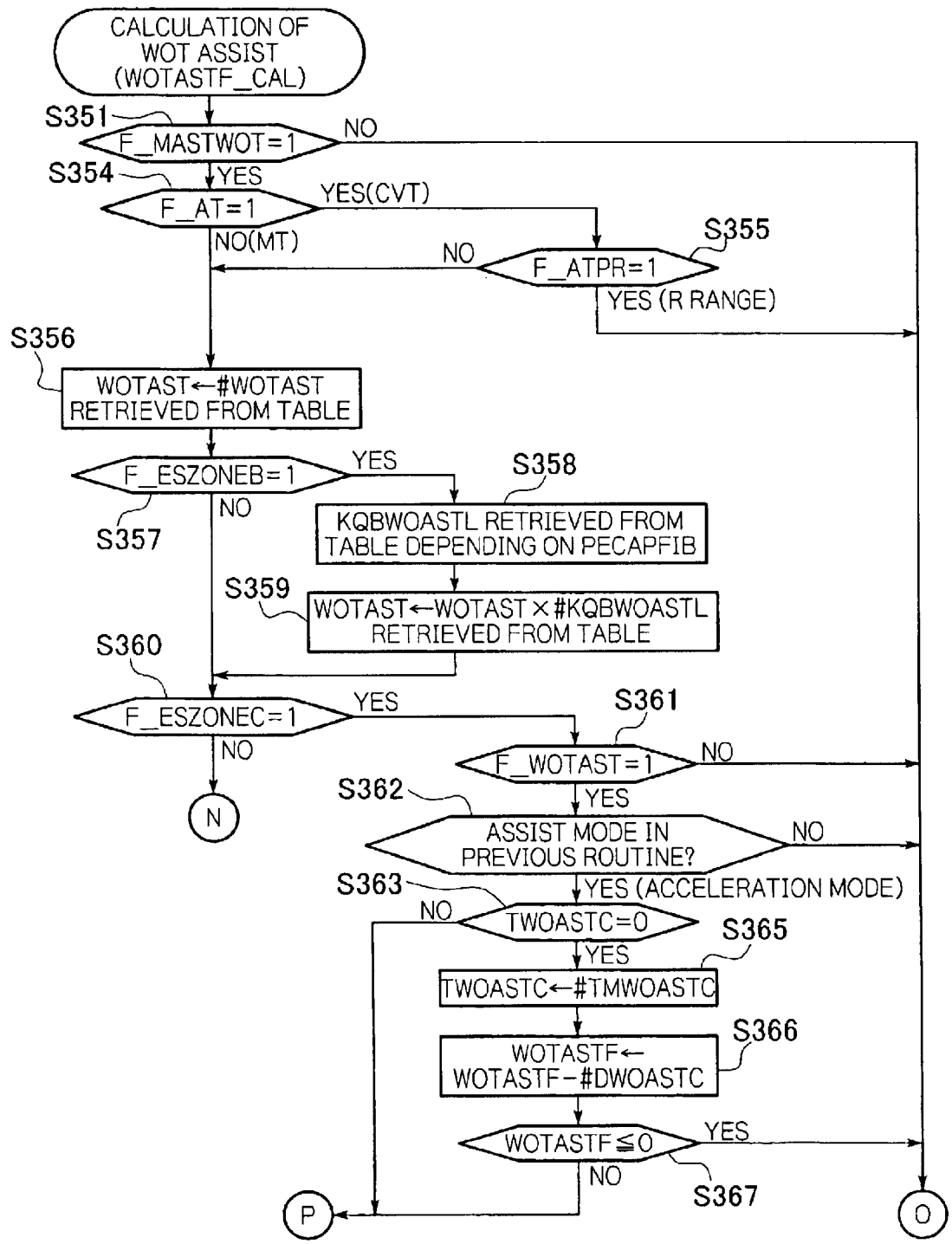
FIG. 14 is a flowchart showing the operation for calculating the amount of WOT assist.
Figure 15:
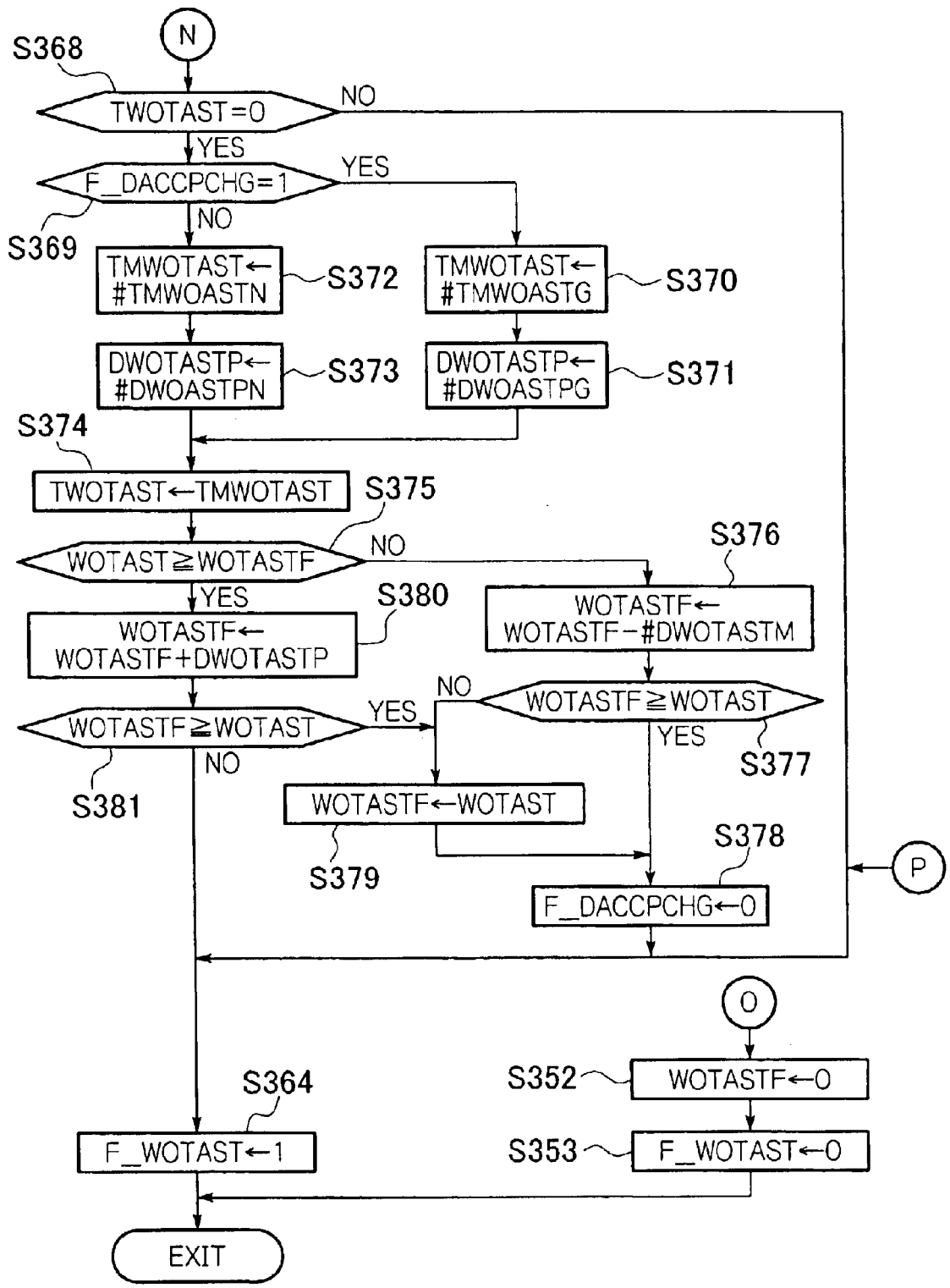
FIG. 15 is also a flowchart showing the operation for calculating the amount of WOT assist.

FIGS. 14 and 15 are flowcharts showing the operation for calculating the amount of WOT assist.

First, in step S351 shown in FIG. 14, it is determined whether the WOT motor assist indication flag F_MASTWOT is "1".

When the result of the determination is "NO", the operation proceeds to step S352 in which the final WOT assist command WOTASTF is set to "0", and the operation proceeds to step 353. In step 353, the WOT assist flag F_WOTAST is set to "0", and the control operation is terminated.

In contrast, when the result of the determination is "YES", the operation proceeds to step S354.

In step S354, it is determined whether the value of the MT/CVT indication flag F_AT is "1".

When the result of the determination is "YES", which means that the present vehicle employs a CVT, the operation proceeds to step S355 in which it is determined whether the value of areverse position indication flag F_ATPR is "1". When the result of the determination in step 354 is "YES", which meas that the present gear position is reverse, the operation proceeds to step S352 explained above.

In contrast, when the result of the determination is "NO", which means that the present vehicle employs an MT, or when the result of the determination in step S354 is "NO", the operation proceeds to step S356.

In step S356, the WOT assist trigger threshold THWOAST, which varies depending on the engine revolution NE and the present value THEM of the degree of throttle opening TH, and which includes hysteresis, and a WOT assist lattice point THWOASTT are calculated. The WOT assist command, which increases from a WOT low assist table value WOTASTL to a WOT high assist t able value WOTASTH as the present value THEM of the degree of throttle opening TH increases from the WOT assist trigger threshold THWOAST to the WOT assist lattice point THWOASTT, is retrieved from a table.

In step S357, in which it is determined whether the value of an energy storage zone B flag F_ESZONEB is "1".

When the result of the determination is "YES", which means that the state of charge of the battery SOC is in the zone B, the operation proceeds to step S358. In contrast, when the result of the determination is "NO", the operation proceeds to step S360, which will be explained below.

Figure 16:
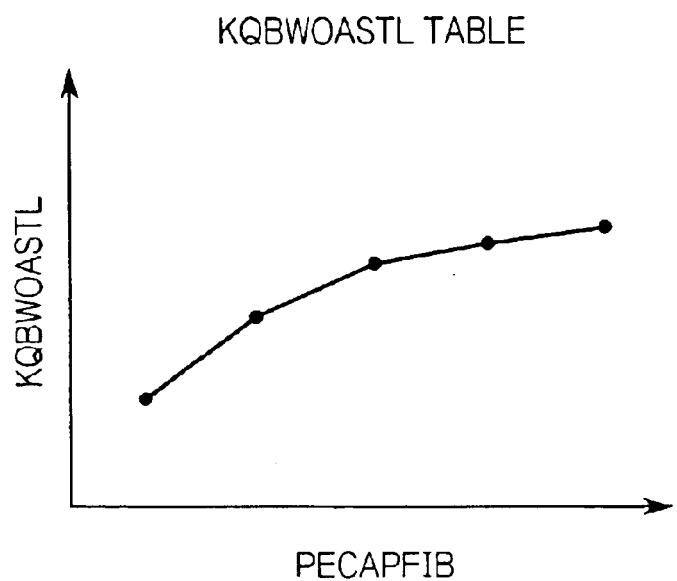
FIG. 16 is a graph showing variation of table values for the WOT assist amount lowest coefficient KQBWOASTL with respect to a use-permission zone PECAPFIB.

In step S358, the WOT assist amount lowest coefficient KQBWOASTL, which increases as the use-permission zone PECAPFIB of the state of charge SOC increases, as shown in FIG. 16, is retrieved from a table.

Figure 17:
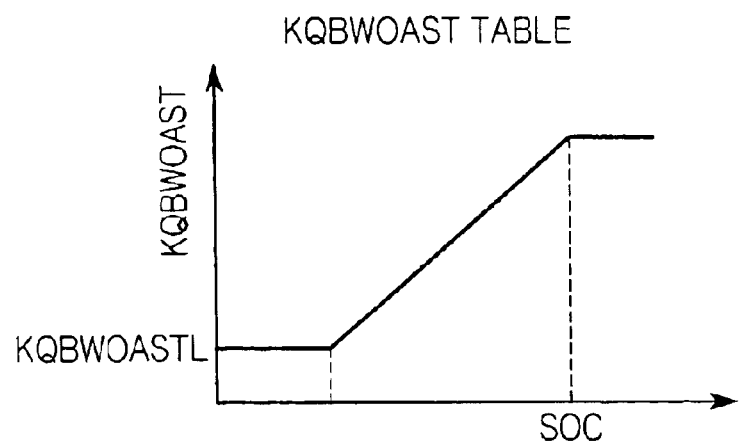
FIG. 17 is a graph showing variation of table values for the WOT assist amount coefficient KQBWOAST with respect to a state of charge of a battery SOC.

In step S359, the WOT assist amount coefficient KQBWOAST, which increases from the lowest table value KQBWOASTL to a predetermined highest value as the state of charge SOC increases, as shown in FIG. 17, is retrieved from a table, and a value obtained by multiplying the WOT assist command WOTAST and the WOT assist amount coefficient KQBWOAST retrieved from the table is newly set as the WOT assist command WOTAST, and then the operation proceeds to step S360.

In other words, in the zone B which is a temporary use zone (from SOC 25% to SOC 40%), the WOT assist amount coefficient KQBWOAST is set so that the WOT assist command WOTAST decreases, i.e., the amount of assist decreases, as the state of charge of the battery SOC decreases from the zone A which is a normal use zone toward the zone C which is a excessively discharged zone.

The WOT assist amount coefficient KQBWOAST is set so as to vary in accordance not only with the state of charge of the battery SOC but also with the use-permission zone PECAPFIB defined with respect to the state of charge of the battery Soc.

More specifically, the slope of the WOT assist amount coefficient KQBWOAST with respect to the change in the state of charge of the battery SOC is variable in accordance with the use-permission zone PECAPFIB. For example, when the use-permission zone PECAPFIB is large as in the case of non-deteriorated battery, the total amount of assist available in the zone B which is a temporary use zone is increased by setting the slope, which is defined by the decreasing WOT assist amount coefficient KQBWOAST as the state of charge of the battery SOC decreases from the zone A which is a normal use zone toward the zone C which is a excessively discharged zone, to be gentle. For example, in this embodiment, the predetermined highest value of the WOT assist amount coefficient KQBWOAST (e.g., a value corresponding to the state of charge of the battery SOC of 40%) is fixed, and the lowest WOT assist amount coefficient KQBWOASTL retrieved from a table (e.g., a value corresponding to the state of charge of the battery SOC of 25%) is increased so that the slope of the decreasing WOT assist amount coefficient KQBWOAST is set to be gentle.

In step S360, it is determined whether the value of the energy storage zone C flag F_ESZONEC is "1".

When the result of the determination is "YES", which means that the state of charge of the battery SOC is in the zone C, the operation proceeds to step S361. In contrast, when the result of the determination is "NO", the operation proceeds to step S368, which will be explained below.

In step S361, it is determined whether the value of the WOT assist flag F_WOTAST is "1".

When the result of the determination is "NO", the operation proceeds to step S352 explained above.

In contrast, when the result of the determination is "YES", the operation proceeds to step S362 in which it is determined whether, in the previous routine, the system was in the acceleration mode in which the engine E is assisted.

When the result of the determination in step S362 is "NO", the operation proceeds to step S352 explained above.

In contrast, when the result of the determination in step S362 is "YES", which means that, in the previous routine, the system was in the acceleration mode in which the engine E is assisted operation proceeds to step S363.

In step S363, it is determined whether the value of a subtraction timer TWOASTC is "0".

When the result of the determination is "NO", the operation proceeds to step S364 in which the value of the WOT assist flag F_WOTAST is set to "1", and the control operation is terminated.

In contrast, when the result of the determination is "YES", the operation proceeds to step S364 in which a predetermined gradual subtraction renewal timer #TMWOASTC is set in the subtraction timer TWOASTC, and the operation proceeds to step S366.

In step S366, a value obtained by subtracting a predetermined gradual subtraction term #DWOASTC from the final WOT assist command WOTASTF is newly set as the final WOT assist command WOTASTF.

In step S367, it is determined whether the value of the final WOT assist command WOTASTF is equal to or smaller than "0".

When the result of the determination is "YES", the operation proceeds to step S352 explained above, whereas, when the result of the determination is "NO", the operation proceeds to step S364 explained above.

In step S368, it is determined whether the value of a WOT assist command subtraction timer TWOTAST is "0".

When the result of the determination is "NO", the operation proceeds to step S364 explained above.

In contrast, when the result of the determination is "YES", the operation proceeds to step S369 in which it is determined whether the value of the flag F_DACCPCHG is "1". The flag F_DACCPCHG indicates that an assist should be executed when the air-fuel ratio is switched.

When the result of the determination in step S369 is "YES", the operation proceeds to step S370 in which a predetermined gradual addition renewal timer #TMWOASTG is set in a subtraction timer TMWOTAST, and the operation proceeds to step S371. In step S371, a predetermined gradual addition term #DWOASTPG is set in a final WOT assist command gradual addition term DWOTASTP, and the operation proceeds to step S374.

In contrast, when the result of the determination in step S369 is "NO", the operation proceeds to step S372 in which a predetermined gradual addition renewal timer #TMWOASTN is set in the subtraction timer TMWOTAST, and the operation proceeds to step S373. In step S373, a predetermined gradual addition term #DWOASTPN is set in the final WOT assist command gradual addition term DWOTASTP, and the operation proceeds to step S374.

In step S374, the subtraction timer TMWOTAST is set in the WOT assist command subtraction timer TWOTAST, and the operation proceeds to step S375 in which it is determined whether the WOT assist command WOTAST is equal to or greater than the final WOT assist command WOTASTF.

When the result of the determination is "YES", the operation proceeds to step S380, which will be explained below.

In contrast, when the result of the determination is "NO", the operation proceeds to step S376 in which a value obtained by subtracting a predetermined gradual subtraction term #DWOASTM from the final WOT assist command WOTASTF is newly set as the final WOT assist command WOTASTF.

In step S377, it is determined whether the final WOT assist command WOTASTF is equal to or greater than the WOT assist command WOTAST.

When the result of the determination is "YES", the operation proceeds to step S378 in which the value of the flag F_DACCPCHG is set to "0", the operation proceeds to step S364 explained above.

In contrast, when the result of the determination is "NO", the operation proceeds to step S379 in which the WOT assist command WOTAST is set in the final WOT assist command WOTASTF, and the operation proceeds to step S378 explained above.

In step S380, a value obtained by adding the final WOT assist command gradual addition term DWOTASTP to the final WOT assist command WOTASTF is newly set as the final WOT assist conunand WOTASTF.

In step S381, it is determined whether the final WOT assist command WOTASTF is equal to or greater than the WOT assist command WOTAST.

When the result of the determination is "YES", the operation proceeds to step S378 explained above. In contrast, when the result of the determination is "NO", the operation proceeds to step S364 explained above.

Operation for Calculating the Amount of ECO Assist

The operation for calculating the amount of ECO assist in the above-mentioned step S314, i.e., the operation for calculating the amount of assist in relatively low load conditions, will be explained below with reference to the appended drawings.

Figure 18:
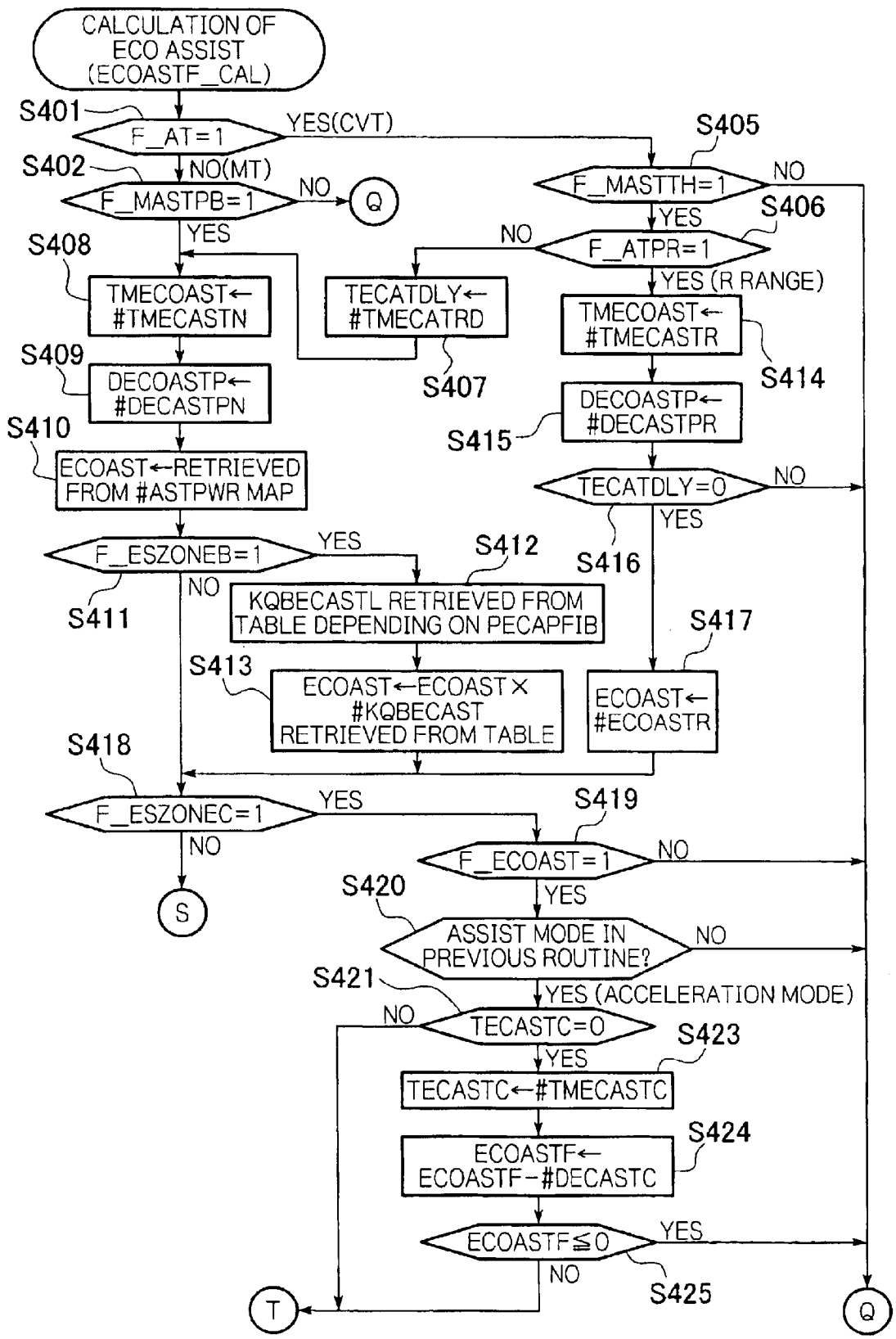
FIG. 18 is a flowchart showing the operation for calculating the amount of ECO assist.
Figure 19:
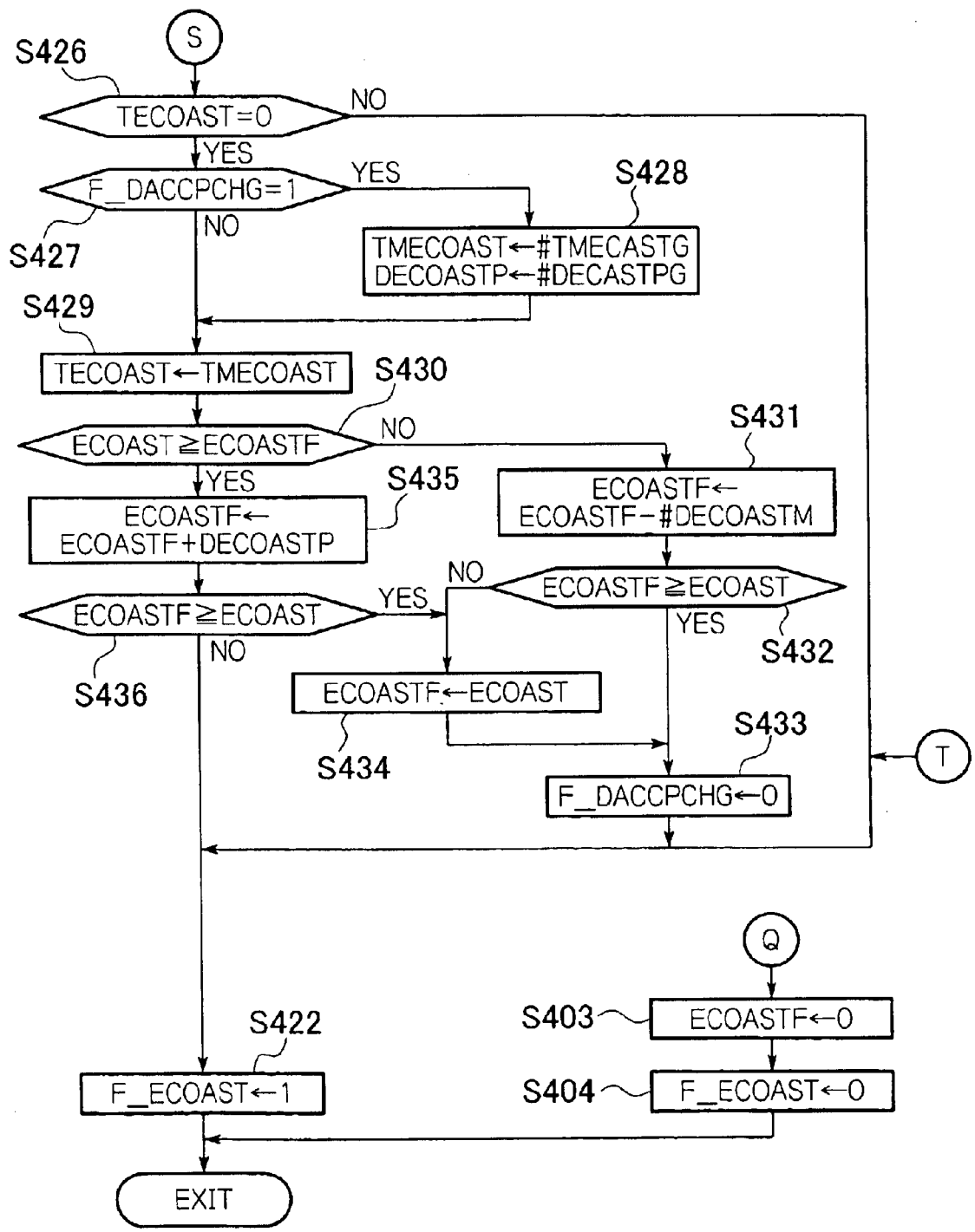
FIG. 19 is also a flowchart showing the operation for calculating the amount of ECO assist.

FIGS. 18 and 19 are flowcharts showing the operation for calculating the amount of ECO assist.

First, in step S401 shown in FIG. 18, it is determined whether the value of the MT/CVT indication flag F_AT is "1".

When the result of the determination is "YES", which means that the present vehicle employs a CVT, the operation proceeds to step S405, which will be explained below.

In contrast, when the result of the determination is "NO", which means that the present vehicle employs an MT, the operation proceeds to step S402 in which it is determined whether the value of the intake negative pressure motor assist indication flag F_MASTPB is "1".

When the result of the determination in step S402 is "YES", the operation proceeds to step S408, which will be explained below.

In contrast, when the result of the determination in step S402 is "NO", the operation proceeds to step S403 in which the value of the final ECO assist command ECOASTF is set to "0", and the operation proceeds to step S404. In step S404, the value of the ECO assist flag F_ECOAST is set to "0", and the control operation is terminated.

In step S405, it is determined whether the value of the throttle motor assist indication flag F_MASTTH is "1".

When the result of the determination is "NO", the operation proceeds to step S403 explained above.

In contrast, when the result of the determination is "YES", the operation proceeds to step S406 in which it is determined whether the value of the reverse position indication flag F_ATPR is "1".

When the result of the determination in step S406 is "YES", which means that the transmission is in reverse position, the operation proceeds to step S414, which will be explained below.

In contrast, when the result is "NO", which means that the transmission is in a position other than the reverse position, the operation proceeds to step S407.

In step S407, a predetermined reverse position assist permission delay value #TMECATRD is set in a reverse position assist permission delay timer TECATDLY.

In step S408, a predetermined gradual addition renewal timer #TMECASTN is set in a subtraction timer TMECOAST, and the operation proceeds to step S409, in which a predetermined gradual addition term #DECASTPN is set in a final ECO assist command gradual addition term DECOASTP, and then the operation proceeds to step S410.

Next, in step S410, a predetermined assist command #ASTPWR, which is defined so as correspond to the engine revolution NE and the absolute values of the intake passage negative pressure, is retrieved from a table, and the assist command #ASTPWR is set in the ECO assist command ECOAST.

In step S411, it is determined whether the value of an energy storage zone B flag F_ESZONEB is "1".

When the result of the determination is "YES", which means that the state of charge of the battery SOC is in the zone B, the operation proceeds to step S412. In contrast, when the result of the determination is "NO", the operation proceeds to step S418, which will be explained below.

Figure 20:
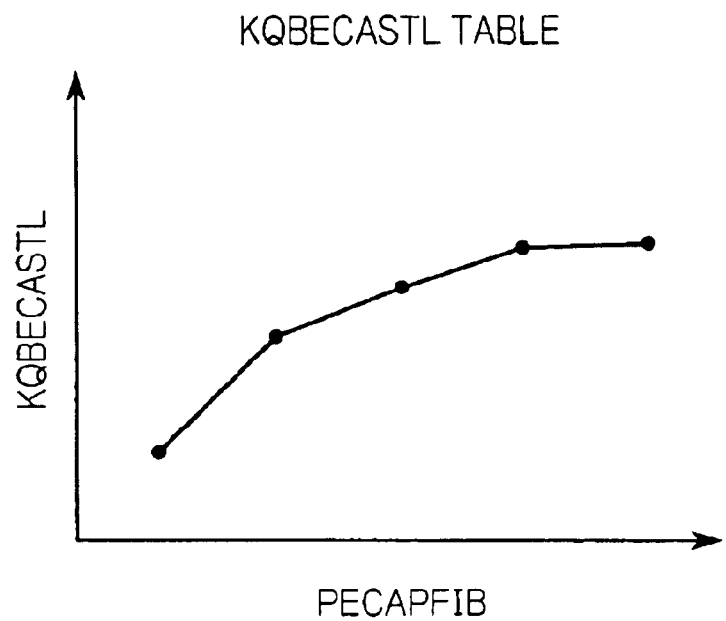
FIG. 20 is a graph showing variation of table values for the ECO assist amount coefficient KQBECAST with respect to the state of charge of the battery SOC.

In step in step S412, the ECO assist amount lowest coefficient KQBECASTL, which increases as the use-permission zone PECAPFIB of the state of charge SOC increases, as shown in FIG. 20, is retrieved from a table.

Figure 21:
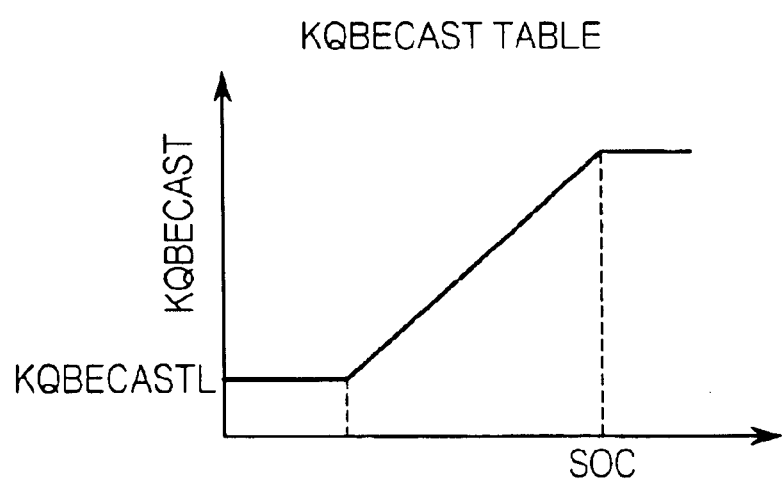
FIG. 21 is a graph showing variation of table values for the ECO assist amount lowest coefficient KQBECASTL with respect to the state of charge of the battery SOC.

In step in step S413, the ECO assist amount coefficient KQBECAST, which increases from the lowest table value KQBECASTL to a predetermined highest value as the state of charge SOC increases, as shown in FIG. 21, is retrieved from a table, and a value obtained by multiplying the ECO assist command ECOAST and the ECO assist amount coefficient KQBECAST retrieved from the table is newly set as the ECO assist command ECOAST, and then the operation proceeds to step S418.

In other words, in the zone B which is a temporary use zone (from SOC 25% to SOC 40%), the ECO assist amount coefficient KQBECAST is set so that the ECO assist command ECOAST decreases, i.e., the amount of assist decreases, as the state of charge of the battery SOC decreases from the zone A which is a normal use zone toward the zone C which is an excessively discharged zone.

The ECO assist amount coefficient KQBECAST is set so as to vary in accordance not only with the state of charge of the battery SOC but also with the use-permission zone PECAPFIB defined with respect to the state of charge of the battery SOC.

More specifically, the slope of the ECO assist amount coefficient KQBECAST with respect to the change in the state of charge of the battery SOC is variable in accordance with the use-permission zone PECAPFIB. For example, when the use-permnission zone PECAPFIB is large as in the case of non-deteriorated battery, the total amount of assist available in the zone B which is a temporary use zone is increased by setting the slope, which is defined by the decreasing ECO assist amount coefficient KQBECAST as the state of charge of the battery SOC decreases from the zone A which is a normal use zone toward the zone C which is a excessively discharged zone, to be gentle. For example, in this embodiment, the predetermined highest value of the ECO assist amount coefficient KQBECAST (e.g., a value corresponding to the state of charge of the battery SOC of 40%) is fixed, and the lowest ECO assist amount coefficient KQBECASTL retrieved from a table (e.g., a value corresponding to the state of charge of the battery SOC of 25%) is increased so that the slope of the decreasing ECO assist amount coefficient KQBECAST is set to be gentle.

In step S414, a predetermined gradual addition renewal timer #TMECASTR is set in a subtraction timer TMECOAST, and the operation proceeds to step S415 in which a predetermined gradual addition term #DECASTPR is set in a final ECO assist command gradual addition term DECOASTP, and the operation proceeds to step S416.

In step S416, it is determined whether the value of the reverse position assist permission delay timer TECATDLY is "0".

When the result is "NO", the operation proceeds to step S403 explained above.

When the result is "YES", the operation proceeds to step S417 in which a predetermined amount of reverse position assist #ECOASTR is set in the ECO assist command ECOAST, and the operation proceeds to step S418.

In step S418, it is determined whether the value of the energy storage zone C flag F_ESZONEC is "1".

When the result of the determination is "YES", which means that the state of charge of the battery SOC is in the zone C, the operation proceeds to step S419. In contrast, when the result of the determination is "NO", the operation proceeds to step S426, which will be explained below.

In step S419, it is determined whether the value of the ESO assist flag F_ECOAST is "1".

When the result of the determination is "NO", the operation proceeds to step S403 explained above.

In contrast, when the result of the determination is "YES", the operation proceeds to step S420 in which it is determined whether, in the previous routine, the system was in the acceleration mode in which the engine E is assisted.

When the result of the determination in step S420 is "NO", the operation proceeds to step S403 explained above.

In contrast, when the result of the determination on step S420 is "YES", which means that, in the previous routine, the system was in the acceleration mode in which the engine E is assisted operation proceeds to step S421.

In step S421, it is determined whether the value of a subtraction timer TECASTC is "0".

When the result of the determination is "NO", the operation proceeds to step S422 in which the value of the ECO assist flag F_ECTAST is set to "1", and the control operation is terminated.

In contrast, when the result of the determination is "YES", the operation proceeds to step S423 in which a predetermined gradual subtraction renewal timer #TMECASTC is set in the subtraction timer TECASTC, and the operation proceeds to step S424.

In step S424, a value obtained by subtracting a predetermined gradual subtraction term #DECASTC from the final ECO assist command ECOASTF is newly set as the final ECO assist command ECOASTF.

In step S425, it is determined whether the value of the final ECO assist command ECOASTF is equal to or smaller than "0".

When the result of the determination is "YES", the operation proceeds to step S403 explained above, whereas, when the result of the determination is "NO", the operation proceeds to step S422 explained above.

In step S426, it is determined whether the value of a ECO assist command subtraction timer TECOAST is "0".

When the result of the determination is "NO", the operation proceeds to step S422 explained above.

In contrast, when the result of the determination is "YES", the operation proceeds to step S427 in which it is determined whether the value of the flag F_DACCPCHG is "1". The flag F_DACCPCHG indicates that an assist should be executed when the air-fluel ratio is switched.

When the result of the determination in step S427 is "YES", the operation proceeds to step S428 in which a predetermined gradual addition renewal timer #TMECASTG is set in a subtraction timer TMECOTAST, and a predetermined gradual addition term #DECASTPG is set in a final ECO assist command gradual addition term DECOTASTP, and the operation proceeds to step S429.

In step S429, the subtraction timer TMECOAST is set in the ECO assist command subtraction timer TECOAST, and the operation proceeds to step S430 in which it is determined whether the ECO assist command ECOAST is equal to or greater than the final ECO assist command ECOASTF.

When the result of the determination is "YES", the operation proceeds to step S435, which will be explained below.

In contrast, when the result of the determination is "NO", the operation proceeds to step S431 in which a value obtained by subtracting a predetermined gradual subtraction term #DECOASTM from the final ECO assist command ECOASTF is newly set as the final ECO assist command ECOASTF.

In step S432, it is determined whether the final ECO assist command ECOASTF is equal to or greater than the ECO assist command ECOAST.

When the result of the determination is "YES", the operation proceeds to step S433 in which the value of the flag F_DACCPCHG is set to "0", the operation proceeds to step S422 explained above.

In contrast, when the result of the determination is "NO", the operation proceeds to step S434 in which the ECO assist command ECOAST is set in the final ECO assist command ECOASTF, and the operation proceeds to step S433 explained above.

In step S435, a value obtained by adding the final ECO assist command gradual addition term DECOASTP to the final ECO assist command ECOASTF is newly set as the final ECO assist command ECOASTF.

In step S436, it is determined whether the final ECO assist command ECOASTF is equal to or greater than the ECO assist command ECOAST.

When the result of the determination is "YES", the operation proceeds to step S433 explained above. In contrast, when the result of the determination is "NO", the operation proceeds to step S422 explained above.

Operation for Calculating a Use-permission Zone PECAPFIB

The operation for calculating a use-permission zone PECAPFIB with respect to the state of charge of the battery SOC, which was referred to in the above steps S358 and S412, will be explained below with reference to the appended drawings.

Figure 22:
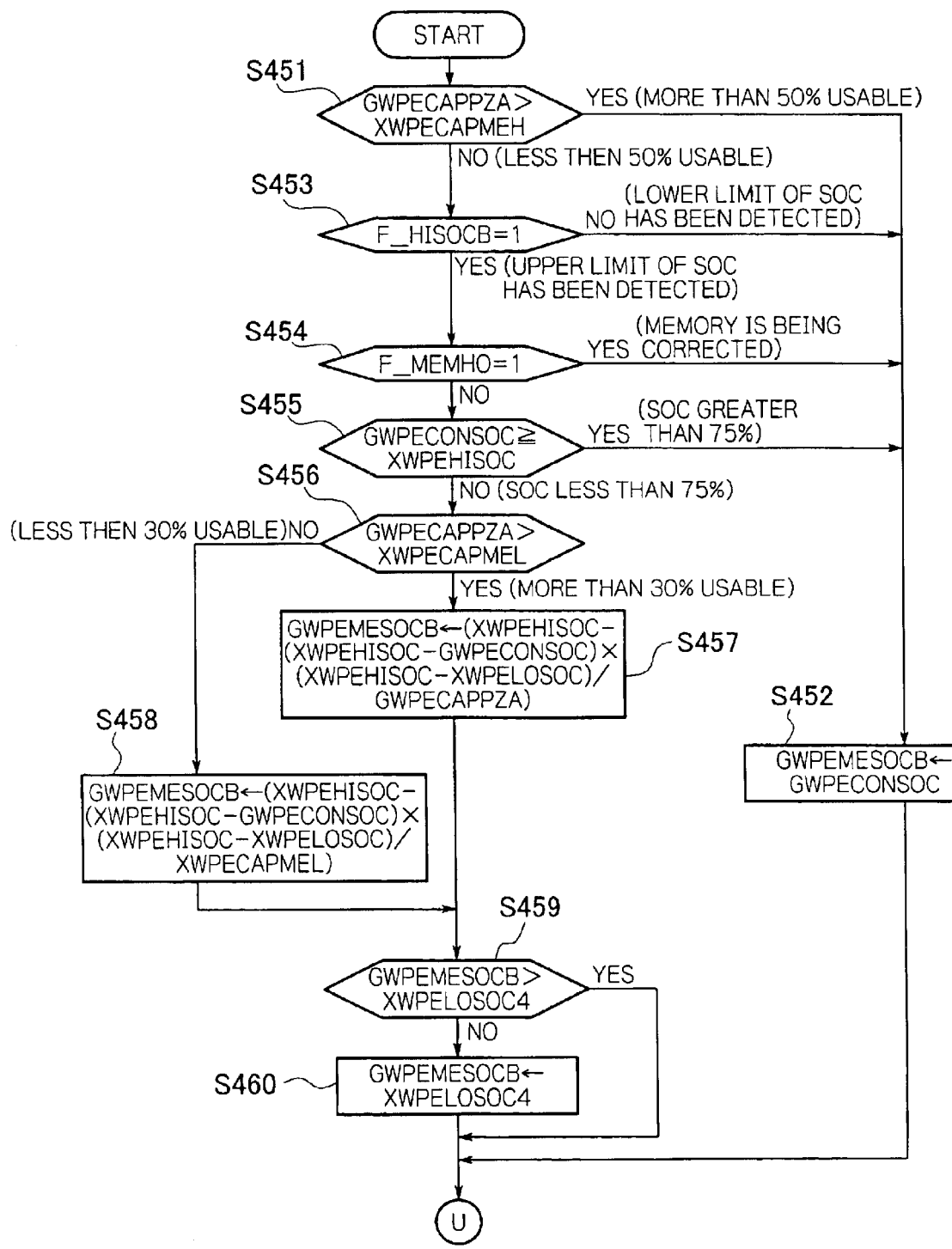
FIG. 22 is a flowchart showing the operation for calculating the use-permission zone PECAPFIB.
Figure 23:
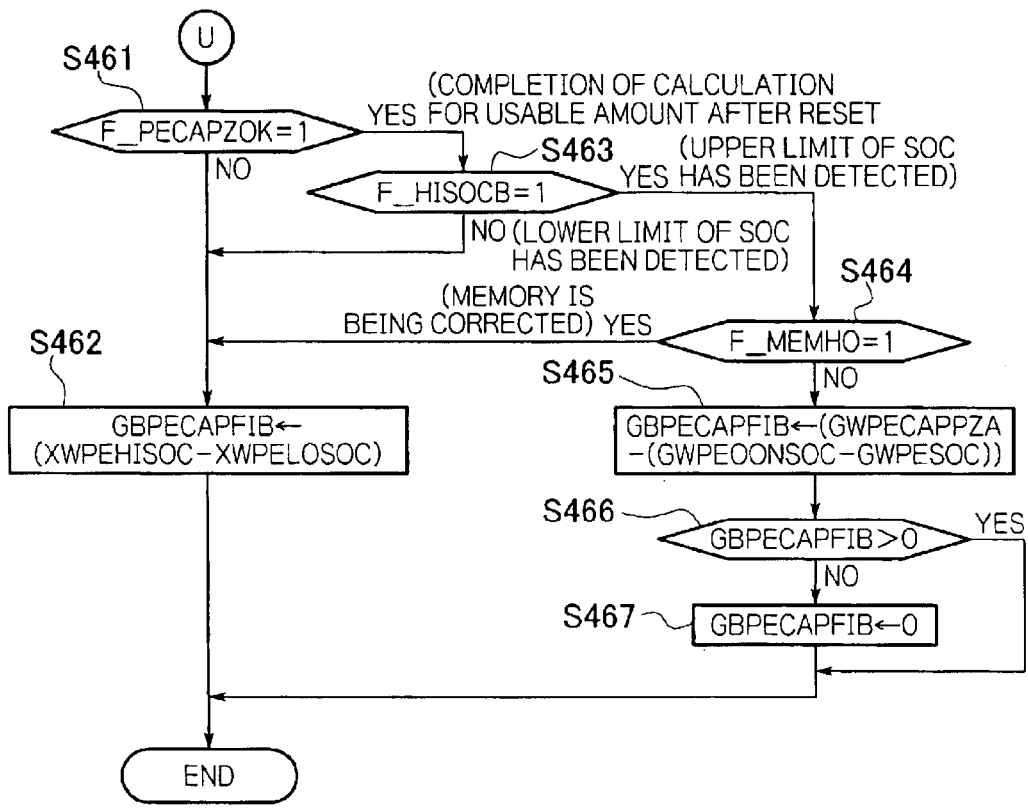
FIG. 23 is also a flowchart showing the operation for calculating the use-permission zone PECAPFIB.
Figure 24:
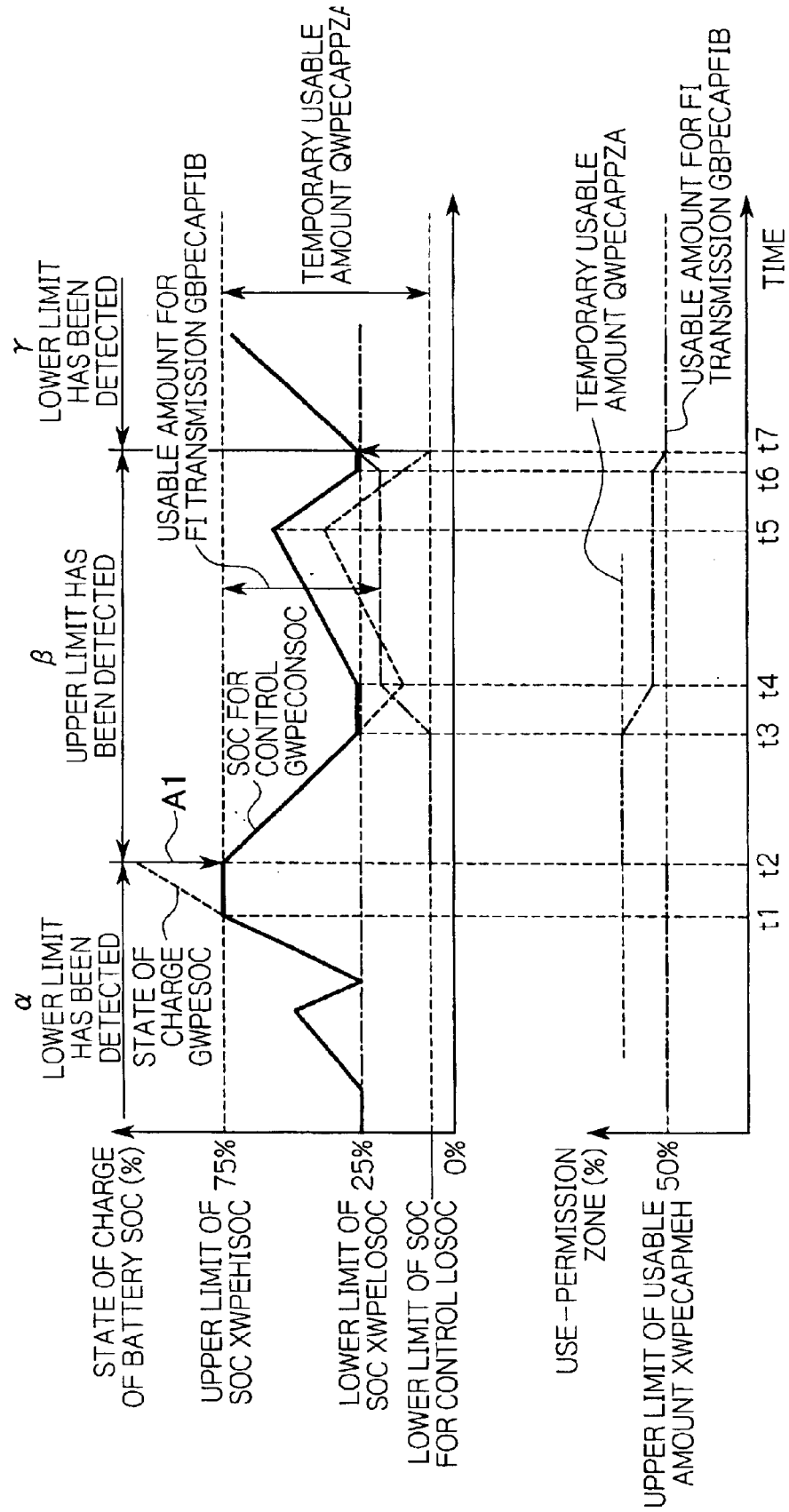
FIG. 24 is a time domain chart showing changes in the state of charge of the battery SOC and the use-permission zone PECAPFIB.
Figure 25:
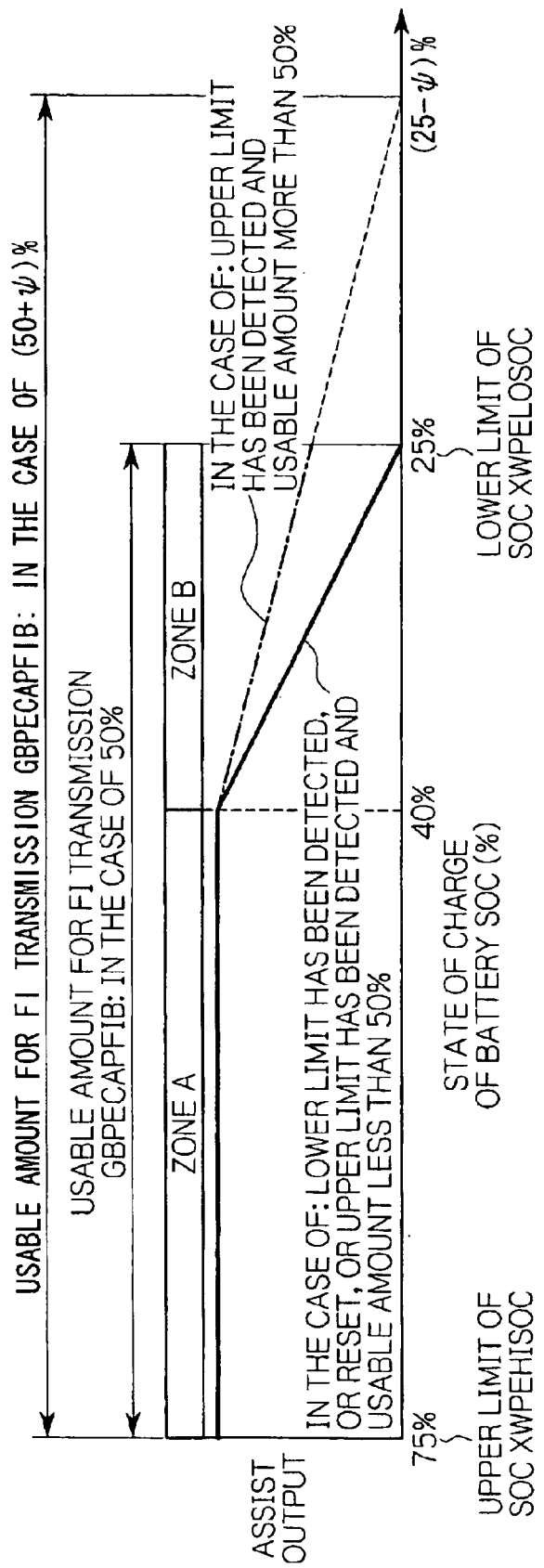
FIG. 25 is a graph showing variation of the amount of power assist in zone B which is a temporary use zone.

FIGS. 22 and 23 are flowcharts showing the operation for calculating the use-permission zone PECAPFIB, FIG. 24 is a time domain chart showing changes in the state of charge of the battery SOC and the use-permission zone PECAPFIB, and FIG. 25 is a graph showing variation of the amount of power assist in zone B which is a temporary use zone.

Note that, in the following description, the use-permission zone PECAPFIB is referred to as a usable amount for FI transmission GBPECAPFIB which is a command transmitted from FIECU11 to motor ECU 1.

First, in step S451 shown in FIG. 22, it is determined whether a temporary value for usable amount GWPECAPPZA is greater than a predetermined upper limit of usable amount XWPECAPMEH (e.g., 50%, etc.).

When the result of the determination is "YES", the operation proceeds to step S452 in which a state of charge for control GWPECONSOC is set in a meter-indicated state of charge GWPEMESOCB, and the operation proceeds to step S461, which will be explained below.

In contrast, when the result of the determination is "NO", the operation proceeds to step S453 in which it is determined whether the value of an upper limit detection flag F_HISOCB is "1". The upper limit detection flag F_HISOCB is used to indicate whether the upper limit of the SOC, such as in the case in which the terminal voltage V of the battery 3 exceeds a predetermined upper limit voltage VU, has been detected.

When the result of the determination is "NO" which means that the lower limit, of th e SOC has been detected, the operation proceeds to step S452.

In contrast, when the result of the determination is "YES", which means that the upper limit of the SOC has been detected, the operation proceeds to step S454.

In step S454, it is determined whether the value of a memory indication flag F_MEMHO, which indicates th at the memory is being corrected, is "1".

When the result of the determination is "YES", the operation proceeds to step S452 explained above.

In contrast, when the result of the determination is "NO", the operation proceeds to step S455 in which it is determined whether the state of charge for control GWPECONSOC is equal to or greater than a predetermined upper limit of state of charge XWPEHISOC (e.g., 70%).

When the result of the determination is "YES", the operation proceeds to step S452 explained above.

In contrast, when the result of the determination is "NO", the operation proceeds to step S456.

In step S456, it is determined whether the temporary value for usable amount GWPECAPZA is greater than a predetermined lower limit of usable amount XWPECAPMEL (e.g., 30%, etc.).

When the result of the determination is "YES", the operation proceeds to step S457 in which the meter indicated state of charge GWPEMESOCB is calculated based on the predetermined upper limit of state of charge XWPEHISOC, a predetermined lower limit of state of charge XWPELOSOC, the state of charge for control GWPECONSOC, and the temporary value for usable amount GWPECAPPZA, and the operation proceeds to step S459.

In contrast, when the result of the determination is "NO", the operation proceeds to step S458 in which the meter indicated state of charge GWPEMESOCB is calculated based on the predetermined upper limit of state of charge XWPEHISOC, a predetermined lower limit of state of charge XWPELOSOC, the state of charge for control GWPECONSOC, and the lower limit of usable amount XWPECAPMEL, and the operation proceeds to step S459.

In step S459, it is determined whether the meter indicated state of charge GWPEMESOCB is greater than the predetermined lower limit of state of charge XWPELOSOC4.

When the result of the determination is "YES", the operation proceeds to step S461.

In contrast, when the result of the determination is "NO", the operation proceeds to step S460 in which the predetermined lower limit of state of charge XWPELOSOC4 is set in the meter indicated state of charge GWPEMESOCB, and the operation proceeds to step S461.

In step S461, it is determined whether the value of a calculation completion indication flag F_PECAPZOK, which indicates that calculation for the temporary value for usable amount is completed, is "1".

When the result of the determination is "NO", the operation proceeds to step S462 in which a value obtained by subtracting the lower limit of state of charge XWPELOSOC from the upper limit of state of charge XWPEHISOC is set in the usable amount for FI transmission GBPECAPFIB, and the control operation is terminated.

In contrast, when the result of the determination is "YES", the operation proceeds to step S463 in which it is determined whether the value of the upper limit detection flag F_HISOCB is "1".

When the result of the determination in step S463 is "NO", the operation proceeds to step S462 explained above.

When the result of the determination in step S463 is "YES", the operation proceeds to step S464.

In step S464, it is determined whether.the value of the memory indication flag F_MEMHO is "1".

When the result of the determination is "YES", the operation proceeds to step S462.

In contrast, when the result of the determination is "NO", the operation proceeds to step S465 in which a value obtained by subtracting another value, which is obtained by subtracting a state of charge GWPESOC calculated based on accumulated charged/discharged amount calculated by accumulating charged/discharged electrical current of the battery 3, from the state of charge for control GWPECONSOC, from the temporary value for usable amount GWPECAPPZA is set in the usable amount for FI transmission GBPECAPFIB.

Note that the state of charge GWPESOC is calculated based on a charge/discharge efficiency map or predetermined equations which have been determined taking into consideration, for example, aging effects such as deterioration of the battery 3.

Next, in step S466, it is determined whether the usable amount for FI transmission GBPECAPFIB is greater than "0".

When the result of the determination is "YES", the control operation is terminated.

When the result of the determination is "NO", the usable amount for FI transmission GBPECAPFIB is set to "0", and the control operation is terminated.

As, for example, in a first zone α shown in FIG. 24, when the battery 3 is gradually charged after the lower limit of the SOC, such as in the case in which the terminal voltage V of the battery 3 falls below a predetermined lower limit voltage VL, has been detected, the state of charge GWPESOC set as the state of charge for control GWPECONSOC (shown as a solid line in FIG. 24) reaches the predetermined upper limit of state of charge XWPEHISOC at time t1. In this case, the value of the state of charge for control GWPECONSOC is replaced by the predetermined upper limit of state of charge XWPEHISOC, and the calculation for the state of charge GWPESOC is continued (shown as a dashed line in FIG. 24).

The value of the state of charge GWPESOC, which has been continuously calculated, is replaced by the predetermined upper limit of state of charge XWPEHISOC at time t2 at which the upper limit of the SOC, such as in the case in which the terminal voltage V of the battery 3 exceeds a predetermined upper limit voltage VU, is detected, and the state of charge GWPESOC is again set as the state of charge for control GWPECONSOC, thus, the state of charge GWPESOC is calibrated.

In this data replacement, a rule is used such that the terminal voltage V of the battery 3 is changed relatively largely in the vicinity of the upper and lower limit of the state of charge of the battery SOC, as in the case of a Ni—MH (nickel metal hydride) battery. In other words, in a range in which change of the voltage is relatively small, such as between the upper and lower limit of the state of charge of the battery SOC, the state of charge of the battery SOC is calculated based on the accumulated amount of the charged/discharged electrical current of the battery 3. By measuring the change in the terminal voltage, the calculated state of charge of the battery SOC is calibrated by the predetermined upper limit and lower limit at the vicinity of the upper and lower limit of the state of charge of the battery SOC; thus, the accuracy of the calculated value is improved.

A lower limit of the state of charge for control LOSOC is set by decreasing the predetermined lower limit of state of charge XWPELOSOC based on, for example, a time period (t2−t1) in which the value of the state of charge for control GWPECONSOC is the predetermined upper limit of state of charge XWPEHISOC, or, based on, for example, a data replacement amount A1 for the state of charge GWPESOC as time t2 at which the upper limit is detected. The temporary value for usable amount GWPECAPPZA is calculated by subtracting the lower limit of the state of charge for control LOSOC from the predetermined upper limit of state of charge XWPEHISOC.

The usable amount for FI transmission GBPECAPFIB (shown as a two-dot chain line in FIG. 24) is set as the temporary value for usable amount GWPECAPPZA which is greater than the predetermined upper limit of usable amount XWPECAPMEH (e.g., 50%, etc.).

As, for example, in a second zone β, shown in FIG. 24, extending after time t2 at which the upper limit is detected, when the battery 3 is gradually charged, the state of charge GWPESOC set as the state of charge for control GWPECONSOC reaches the predetermined lower limit of state of charge XWPELOSOC at time t3. In this case, the value of the state of charge for control GWPECONSOC is replaced by the predetermined lower limit of state of charge XWPELOSOC, and the calculation for the state of charge GWPESOC is continued.

At this point, because the temporary value for usable amount GWPECAPPZA has been calculated, as explained in the above step S465, the usable amount for FI transmission GBPECAPFIB is calculated based on the state of charge for control GWPECONSOC, the state of charge GWPESOC, and the temporary value for usable amount GWPECAPPZA. In other words, in a time period, for example, between time t3 and time t4 shown in FIG. 24, the usable amount for FI transmission GBPECAPFIB is gradually decreased as the difference between the state of charge GWPESOC, which is continuously calculated, and the state of charge for control GWPECONSOC, in which the predetermined lower limit of state of charge XWPELOSOC is set, is increased.

When the state of the battery 3 changes from a discharging state to a charging state at, for example, time t4 shown in FIG. 24, the state of charge for control GWPECONSOC is gradually increased from the predetermined lower limit of state of charge XWPELOSOC, and independently, the state of charge GWPESOC is also increased. When the state of the battery 3 changes from a charging state to a discharging state at, for example, time t5 shown in FIG. 24, the state of charge for control GWPECONSOC and the state of charge GWPESOC are independently and gradually decreased.

When the state of charge for control GWPECONSOC reaches the predetermined lower limit of state of charge XWPELOSOC at, for example, time t6 shown in FIG. 24, the state of charge for control GWPECONSOC is replaced by the predetermined lower limit of state of charge XWPELOSOC, and the calculation for the state of charge GWPESOC is continued.

The usable amount for FI transmission GBPECAPFIB is unchanged from time t4 to time t6 because the difference between the state of charge GWPESOC and the state of charge for control GWPECONSOC is unchanged.

For example, at time t7 at which the lower limit of the SOC, such as in the case in which the terminal voltage V of the battery 3 falls below a predetermined lower limit voltage VL, is detected, and the state of charge GWPESOC, which has been continuously calculated, is replaced by the predetermined lower limit of state of charge XWPELOSOC, and the state of charge GWPESOC is again set as the state of charge for control GWPECONSOC, and thus, the state of charge GWPESOC is calibrated.

In a time period, for example, between time t6 and time t7, the usable amount for FI transmission GBPECAPFIB is gradually decreased as the difference between the state of charge GWPESOC, which is continuously calculated, and the state of charge for control GWPECONSOC, in which the predetermined lower limit of state of charge XWPELOSOC is set, is increased, and the usable amount for FI transmission GBPECAPFIB reaches the predetermined upper limit of usable amount XWPECAPMEH (e.g., 50%, etc.) at time t7 at which the lower limit is detected.

The battery 3 is gradually charged in, for example, a third zone γ after time t7 at which the lower limit is detected, as shown in FIG. 24.

For example, as shown in FIG. 25, in the zone B which is a temporary use zone (e.g., from SOC 25% to SOC 40%), when the lower limit of the SOC has been detected, or when the battery 3 has been reset, or when the upper limit of the SOC has been detected and the usable amount is less than 50%, the amount of power assist (e.g., corresponding to the above-mentioned WOT assist command WOTAST, or ECO assist command ECOAST) is decreased so as to converge to the predetermined lower limit of state of charge XWPELOSOC, as the state of charge of the battery SOC decreases from the zone A which is a normal use zone toward the zone C which is a excessively discharged zone.

On the other hand, when the upper limit of the SOC has been detected and the usable amount is greater than 50%, the amount of power assist (e.g., corresponding to the above-mentioned WOT assist command WOTAST, or ECO assist command ECOAST) in the zone B, which is a normal use zone, is decreased so as to converge to a value (e.g. (25-ψ)%) obtained by subtracting an extra amount ψ of the usable amount from the predetermined lower limit of state of charge XWPELOSOC (e.g., SOC 25%). Accordingly, the total amount of power assist which can be output in the zone B is increased.

According to the control device for a hybrid vehicle in this embodiment, because the amount of power assist (the WOT assist command WOTAST, or the ECO assist command ECOAST) is calculated properly taking into consideration the use-permission zone with respect to the state of charge of the battery SOC, the usable electrical energy stored in the battery 3 can be effectively used; thus, the power of the engine E is effectively assisted by the motor M as demanded.

Industrial Applicability

As explained above, according to the control device for a hybrid vehicle of the present invention, because the amount of power assist is calculated properly taking into consideration the use-permission zone with respect to the state of charge of the battery, the usable electrical energy stored in the battery can be effectively used; thus, the power of the engine is effectively assisted by the motor as demanded.

Moreover, according to the control device for a hybrid vehicle of the present invention, because it is possible to smoothly change the amount of power assist from the charging and discharging permission zone in which both charging and discharging are permitted to the discharging restriction zone in which charging is permitted and discharging is restricted, the usable electrical energy stored in the battery can be effectively,used while ensuring a smooth driveability of the vehicle.

Furthermore, according to the control device for a hybrid vehicle of the present invention, the usable electrical energy stored in the battery can be effectively used, whereby the fuel consumption of the vehicle can be improved.

What is claimed is:

1. A control device for a hybrid vehicle having an engine and a motor for driving said vehicle, and a battery device storing electrical energy converted, by said motor, from a part of the output of said engine or the kinetic energy of said vehicle, said control device comprising:

a control pattern setting section for classifying a state of charge of said battery device into predetermined zones and for setting a specific control pattern for each of said predetermined zones;

a state of charge calculating section for calculating the state of charge of said battery device and calculating a use-permission zone with respect to the state of charge;

an assist amount setting section for setting an amount of power assist provided by said motor for assisting the output of said engine depending on said control pattern set by said control pattern setting section; and an assist amount correcting section for correcting the amount of power assist in accordance with the width of said use-permission zone calculated by said state of charge calculating section.

2. A control device according to claim 1, wherein said control pattern setting section sets a temporary use zone, as one of said predetermined zones, between a charging and discharging permission zone in which both charging and discharging are permitted, and a discharging restriction zone in which charging is permitted and discharging is restricted, and wherein, in said temporary use zone, the amount of assist setting section sets the amount of power assist in accordance with the state of charge calculated by said state of charge calculating section.

3. A control device according to claim 2, wherein the lower the state of charge, the lower the amount of power assist is set by said assist amount setting section sets.

4. A control device according to claim 2, wherein said assist amount correcting section alters the minimum value of the amount of power assist, which is to be set by said assist amount setting section in accordance with the state of charge, in accordance with the width of said use-permission zone calculated by said state of charge calculating section.

5. A control device according to claim 1, wherein the wider said use-permission zone, the greater the minimum value of the amount of power assist is set by said assist amount correcting section.

* * * * *